(12) United States Patent
Miheli et al.

(10) Patent No.: US 11,867,532 B2
(45) Date of Patent: Jan. 9, 2024

(54) ASPIRATING SMOKE DETECTOR PACKAGING

(71) Applicant: Honeywell International Inc., Charlotte, NC (US)

(72) Inventors: Mauro Miheli, Trieste (IT); Gianluca Pace, Trieste (IT); Erika Simeoni, Staranzano (IT)

(73) Assignee: Honeywell International Inc., Charlotte, NC (US)

( * ) Notice: Subject to any disclaimer, the term of this patent is extended or adjusted under 35 U.S.C. 154(b) by 396 days.

(21) Appl. No.: 17/335,308

(22) Filed: Jun. 1, 2021

(65) Prior Publication Data

US 2022/0381592 A1 Dec. 1, 2022

(51) Int. Cl.
*G01D 11/30* (2006.01)
*G01N 15/06* (2006.01)

(52) U.S. Cl.
CPC ............. *G01D 11/30* (2013.01); *G01N 15/06* (2013.01)

(58) Field of Classification Search
CPC ................................ G01D 11/30; G01N 15/06
See application file for complete search history.

(56) References Cited

U.S. PATENT DOCUMENTS

| | | | |
|---|---|---|---|
| 6,720,886 B2 * | 4/2004 | Seelbach | H02B 1/565 340/600 |
| 9,134,716 B2 | 9/2015 | Cole et al. | |
| 9,824,564 B2 * | 11/2017 | Bressanutti | G08B 17/107 |
| 10,115,280 B2 * | 10/2018 | Bressanutti | G08B 17/113 |
| 10,877,011 B2 | 12/2020 | Cummings et al. | |
| 2020/0116688 A1 * | 4/2020 | Bertini | G01N 33/0065 |
| 2022/0383719 A1 * | 12/2022 | Pace | G08B 17/113 |

FOREIGN PATENT DOCUMENTS

| | | | | |
|---|---|---|---|---|
| CN | 1256411 | | 6/2000 | |
| CN | 110613912 A | | 12/2019 | |
| DE | 10114729 A1 | | 10/2002 | |
| EP | 0774742 A2 | | 5/1997 | |
| EP | 0696787 | | 6/1999 | |
| EP | 4099285 A1 | * | 12/2022 | ............. G01D 11/30 |
| RU | 2726142 C1 | | 7/2020 | |

* cited by examiner

*Primary Examiner* — Jamel E Williams
(74) *Attorney, Agent, or Firm* — Brooks, Cameron & Huebsch, PLLC

(57) ABSTRACT

Devices, systems, and methods for aspirating smoke detector packaging are described herein. In some examples, one or more embodiments include a package for an aspirating smoke detector device, comprising a plurality of panels, wherein a first panel includes a mounting template having a plurality of mounting indicators, wherein each of the plurality of mounting indicators corresponds to a respective mounting location of the aspirating smoke detector device, and a second panel includes a head protector configured to be removed from the package and inserted into a slot of the aspirating smoke detector device.

20 Claims, 17 Drawing Sheets

ASPIRATING SMOKE DETECTOR PACKAGING

TECHNICAL FIELD

The present disclosure relates to devices, systems, and methods for aspirating smoke detector packaging.

BACKGROUND

Large facilities (e.g., buildings), such as commercial facilities, office buildings, hospitals, and the like, may have an alarm system that can be triggered during an emergency situation (e.g., a fire) to warn occupants to evacuate. For example, an alarm system may include a control panel (e.g., a fire control panel) and a plurality of aspirating smoke detector devices located throughout the facility (e.g., on different floors and/or in different rooms of the facility) that detect a hazard event, such as smoke generation (e.g., as the result of a fire or otherwise). The aspirating smoke detector can transmit a signal to the control panel in order to notify a building manager, occupants of the facility, emergency services, and/or others of the hazard event via alarms or other mechanisms.

Some users attempting to install or maintain previous aspirating smoke detector devices may face difficulties. For instance, some users may be frustrated in attempting to mount previous aspirating smoke detector devices on a wall or other object. In addition, periodic maintenance performed on previous aspirating smoke detector devices carries risks associated with fouling sensitive components with dust or other debris.

DETAILED DESCRIPTION

Figure 1:
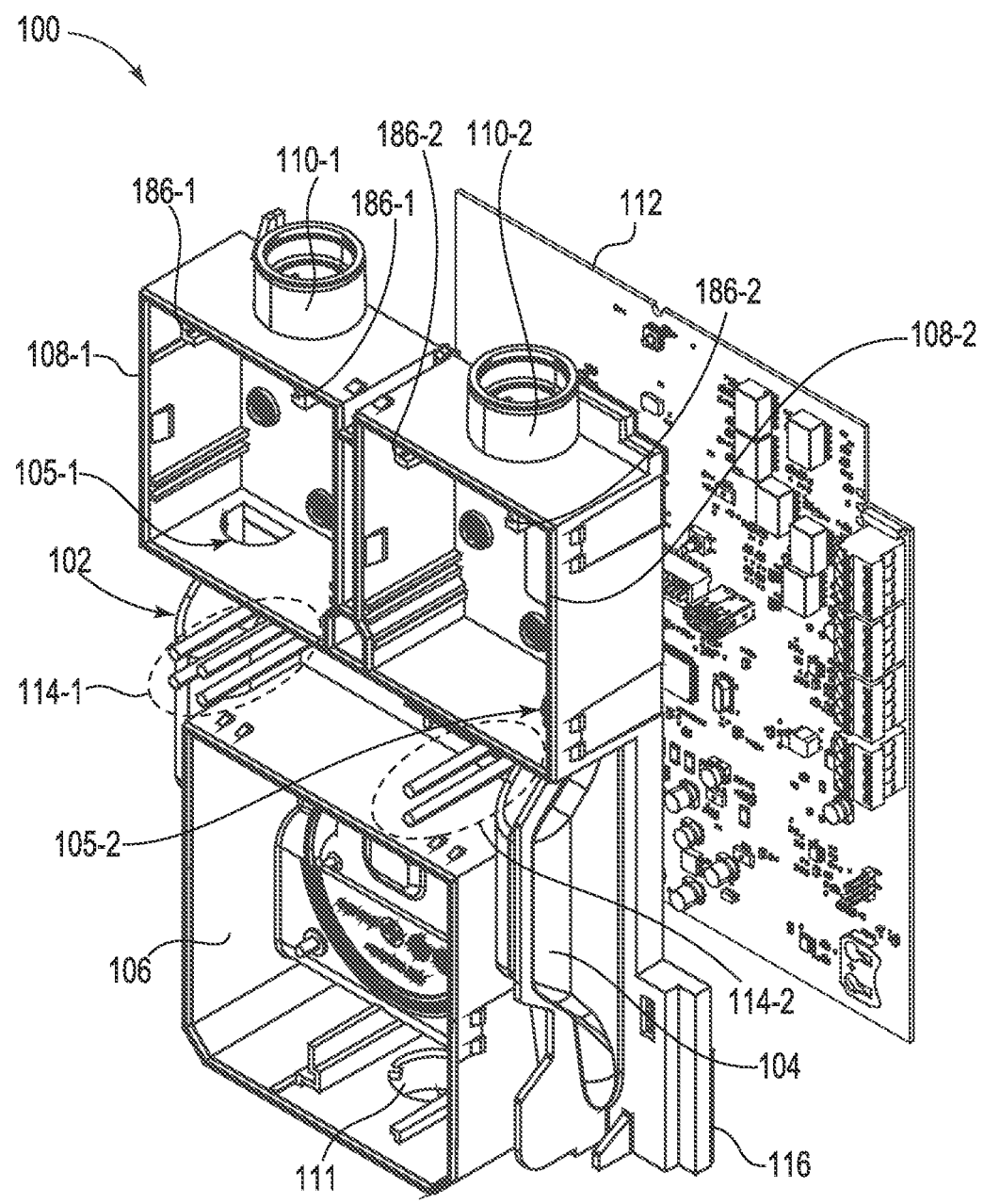
FIG. 1 is an exploded view of an example of a portion of an aspirating smoke detector device in accordance with one or more embodiments of the present disclosure.

Devices, systems, and methods for aspirating smoke detector packaging are described herein. In some examples, one or more embodiments include a package for an aspirating smoke detector device, comprising a plurality of panels, wherein a first panel includes a mounting template having a plurality of mounting indicators, wherein each of the plurality of mounting indicators corresponds to a respective mounting location of the aspirating smoke detector device, and a second panel includes a head protector configured to be removed from the package and inserted into a slot of the aspirating smoke detector device.

An aspirating smoke detector device can be utilized in a facility to detect a hazard event by detecting the presence of smoke. The aspirating smoke detector device can draw gas (e.g., air, via a blower) from the facility into a sensor through a network of pipes throughout the facility. The sensor can sample the gas in order to determine whether the gas includes smoke particles. In response to detection of smoke particles, the aspirating smoke detector device can transmit a signal to a control panel in the facility to signal detection of smoke particles.

However, aspirating smoke detector devices may be difficult to assemble and/or install. For example, assembling an aspirating smoke detector device may require assembly of a blower, a sensor head, and/or other components by utilizing a tool to engage with bolts, screws, or other fasteners. Such a design may result in a cumbersome assembly process, which can result in increases in assembly time for the aspirating smoke detector device.

An aspirating smoke detector device according to the present disclosure can allow for a compact and modular aspirating smoke detector device that can be lower cost and easier to assemble as compared with previous approaches. For example, an aspirating smoke detector device according to the present disclosure can allow for tool-less assembly without the need for fasteners, which can result in decreased assembly time and lower assembly cost as compared with previous approaches.

Various difficulties faced by users attempting to install and/or maintain an aspirating smoke detector device can be addressed by packing in accordance with embodiments herein. Moreover, these difficulties can be addressed without the need for users to acquire additional tooling, skills, or components because the packaging of the aspirating smoke detector device itself carries helpful solutions with it.

For instance, some users may be frustrated in attempting to mount previous aspirating smoke detector devices on a wall or other object. The location(s) and or spacing of holes to be drilled may be difficult, particularly with increased numbers of holes. Embodiments of the present disclosure provide a mounting template on a panel of the package containing the aspirating smoke detector device. In some embodiments, the mounting template includes a plurality of mounting indicators. These mounting indicators align with mounting locations (e.g., holes) on a rear surface of a housing of the aspirating smoke detector device. Thus, a user can place the template on the surface where the aspirating smoke detector device is to be mounted. The mounting indicators can indicate where holes should be drilled for mounting the aspirating smoke detector device via fasteners (e.g., screws). In some embodiments, drilling can be performed directly through the mounting indicators.

In addition, periodic maintenance performed on previous aspirating smoke detector devices carries risks associated with fouling sensitive components with dust or other debris. In one example, removing a filter for periodic cleaning or replacement can dislodge dust that can fall, or otherwise deposit, on a sensor head. Dust on a sensor head can negatively affect the operation of the sensor head. Embodiments of the present disclosure provide a number of removable head protectors on a panel of the package containing the aspirating smoke detector device. A head protector can be defined by perforations in the panel, for instance, which can allow the head protector to be removed by hand (e.g., without the use of a tool). In some embodiments, the head protector can be inserted into a slot of a sensor head housing between the filter and the sensor head. Accordingly, any dust or debris dislodged by the removal of the filter can be prevented from reaching the sensor head by the head protector. After cleaning or replacement of the filter is completed, the head protector can be removed and the aspirating smoke detector device can resume functioning.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an exploded view of an example of a portion of an aspirating smoke detector device 100, in accordance with one or more embodiments of the present disclosure. The aspirating smoke detector device 100 can include a manifold 102 and a PCB 112.

As illustrated in FIG. 1, the aspirating smoke detector device 100 can include a printed circuit board (PCB) 112. As used herein, the term "PCB" refers to a device to mechanically support and/or electrically connect electrical components via conductive traces. The PCB 112 can, therefore, include electrical components utilized in detection of smoke via the aspirating smoke detector device 100. For example, although not illustrated in FIG. 1 for clarity and so as not to obscure embodiments of the present disclosure, the aspirating smoke detector device 100 can include a blower and sensor head housings. The PCB 112 can be utilized to control the blower (e.g., the speed of the blower), receive signals from the sensor head housings, etc. The PCB 112 can, accordingly, be utilized to control operation of the aspirating smoke detector device 100 to detect smoke particles in a gas flowing through the aspirating smoke detector device 100 and transmit a signal to a control panel in response to detection of smoke particles in the gas. The PCB 112 can include buttons (e.g., not illustrated in FIG. 1), light emitting diodes (LEDs), as are further described in connection with FIG. 6, among other electrical components.

As shown in the exploded view of FIG. 1, the aspirating smoke detector device 100 can further include a manifold 102. As used herein, the term "manifold" refers to a device including at least one inlet and at least one outlet. For example, the manifold 102 can make up a portion of the aspirating smoke detector device 100 and can include various parts, including a flow path 104, a blower housing 106, a first sensor head housing 108-1, and a second sensor head housing 108-2, as are further described herein.

The manifold 102 can be manufactured of a plastic material. For example, the manifold 102 can be manufactured from acrylonitrile butadiene styrene (ABS) plastic, poly(methyl methacrylate) (PMMA) plastic, thermoplastic elastomers (TPE), among other types of plastic materials. Further, the manifold 102 can be made of any other type of material (e.g., metal, carbon fiber, etc.). The manifold 102 can be manufactured via multi-shot molding techniques, among other manufacturing techniques, as is further described in connection with FIG. 10.

A flow path 104 can be included as part of the manifold 102. The flow path 104 can include a first flow channel 105-1 and a second flow channel 105-2 (referred to collectively herein as flow channels 105). The flow channels 105 can allow for the flow of gas through the aspirating smoke detector device 100. For instance, gas can flow into and out of different portions of the aspirating smoke detector device 100 through the flow channels 105 for smoke detection, as is further described herein.

The manifold 102 can include light pipes 114-1 and 114-2. As used herein, the term "light pipe" refers to a device to transmit light for the purpose of illumination. The light pipes 114 can be of a transparent material to allow light (e.g., from an LED of the PCB 112) to be transmitted, as is further described in connection with FIGS. 6 and 8. The light pipes 114-1 can be in a 2×2 array configuration and the light pipes 114-2 can be in a 1×1 array configuration.

The manifold 102 can include a blower housing 106. The blower housing 106 can be configured to receive a blower (e.g., not illustrated in FIG. 1). The blower can operate to draw gas into and cause gas to flow through the aspirating smoke detector device 100. The blower housing 106 can include a blower housing outlet 111. The gas flowing through the aspirating smoke detector device 100 can exit the aspirating smoke detector device through the blower housing outlet 111.

The first flow channel 105-1 can connect the blower housing 106 to a first sensor head housing 108-1. The first sensor head housing 108-1 can be configured to receive a sensor head (e.g., not illustrated in FIG. 1). The first sensor head housing 108-1 can include a first sensor head housing inlet 110-1. The blower can operate to draw gas into a sensor head located in the first sensor head housing 108-1 via the first sensor head housing inlet 110-1 and out of the first sensor head housing 108-1 via the first flow channel 105-1 for detection of smoke particles in the gas.

Similar to the first flow channel 105-1, the second flow channel 105-2 can connect the blower housing 106 to a second sensor head housing 108-2. The second sensor head housing 108-2 can also be configured to receive a sensor head (e.g., not illustrated in FIG. 1). The second sensor head housing 108-2 can include a second sensor head housing inlet 110-2. The blower can operate to draw gas into another sensor head located in the second sensor head housing 108-2 via the second sensor head housing inlet 110-2 and out of the second sensor head housing 108-2 via the second flow channel 105-2 for detection of smoke particles in the gas.

The first sensor head housing 108-1 can include a first slot component 186-1, and the second sensor head housing 108-2 can include a second slot component 186-2 (sometimes cumulatively referred to as "slot components 186"). The slot components 186, which are described in more detail below, can receive a filter and a head protector as described herein.

As illustrated in FIG. 1, the manifold 102 can further include a gasket 116. As used herein, the term "gasket" refers to a device located around an area of another device to make the area impervious to the transition of fluid through or around the device. For example, the gasket 116 can be located on a "back" side of the manifold 102 which is to interface (e.g., rest against) the PCB 112. The gasket 116 can fluidically seal the manifold 102 to the PCB 112, as is further described in connection with FIG. 2.

Figure 2:
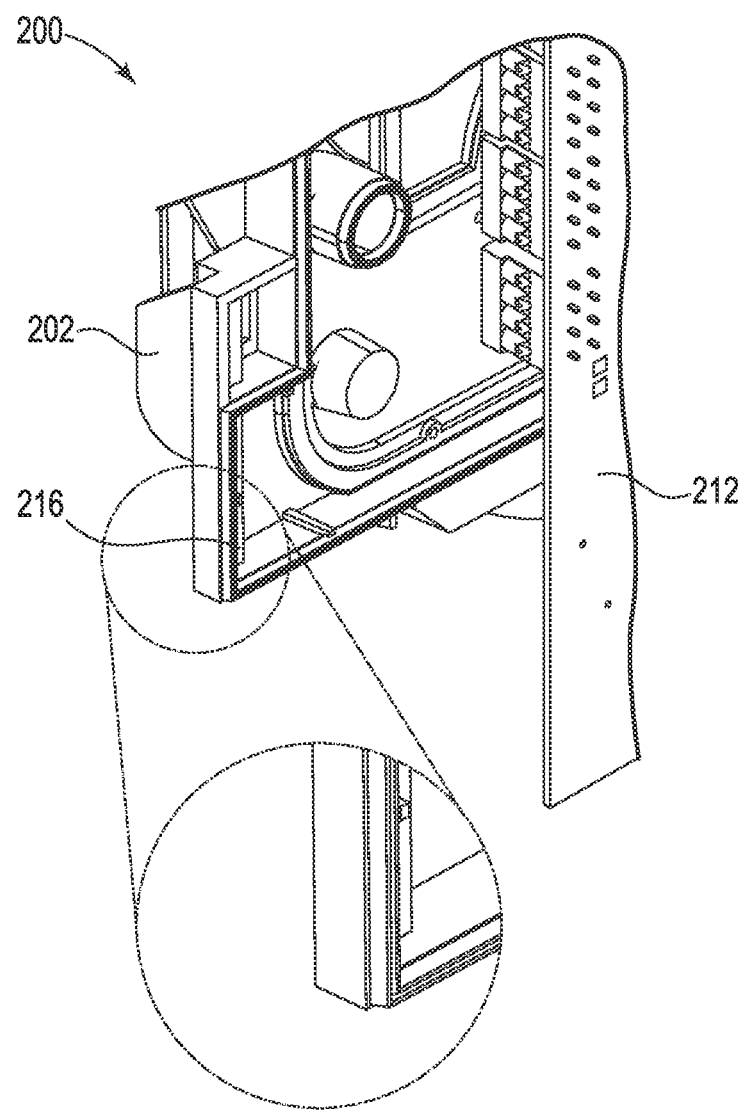
FIG. 2 is an exploded view of an example of a manifold and a printed circuit board (PCB) of an aspirating smoke detector device in accordance with one or more embodiments of the present disclosure.

FIG. 2 is an exploded view of an example of a manifold 202 and a printed circuit board (PCB) 212 of an aspirating smoke detector device 200, in accordance with one or more embodiments of the present disclosure. The manifold 202 can include a gasket 216.

As previously described in connection with FIG. 1, the manifold 202 can include a gasket 216. The gasket 216 can be utilized to fluidically seal the manifold 202 to the PCB 212. For example, when the aspirating smoke detector device 200 is assembled, the manifold 202 can be positioned adjacent to (e.g., resting against) the PCB 212. When the manifold 202 is positioned adjacent to the PCB 212, the gasket 216 can be compressed against the PCB 212 to cause the gasket 216 to fluidically seal the manifold 202 to the PCB 212.

In some examples, the gasket 216 can be a thermo-plastic rubber gasket. The gasket 216 can be created on the manifold 202 via molding techniques, as is further described in connection with FIG. 10. Further, although the gasket 216 is described as a thermo-plastic rubber gasket, embodiments of the present disclosure are not so limited. For example, the gasket 216 can be any other material that can fluidically seal the manifold 202 to the PCB 212.

Fluidically sealing the manifold 202 to the PCB 212 can prevent substances from transiting between the gasket 216 into a space between the manifold 202 and the PCB 212. Such a fluidically sealed space can prevent moisture from entering the space. Accordingly, the gasket 216 can guard against moisture interacting with the PCB 212, preventing shorting of the electrical components of the PCB 212, preventing corrosion of the PCB 212, etc.

Figure 3:
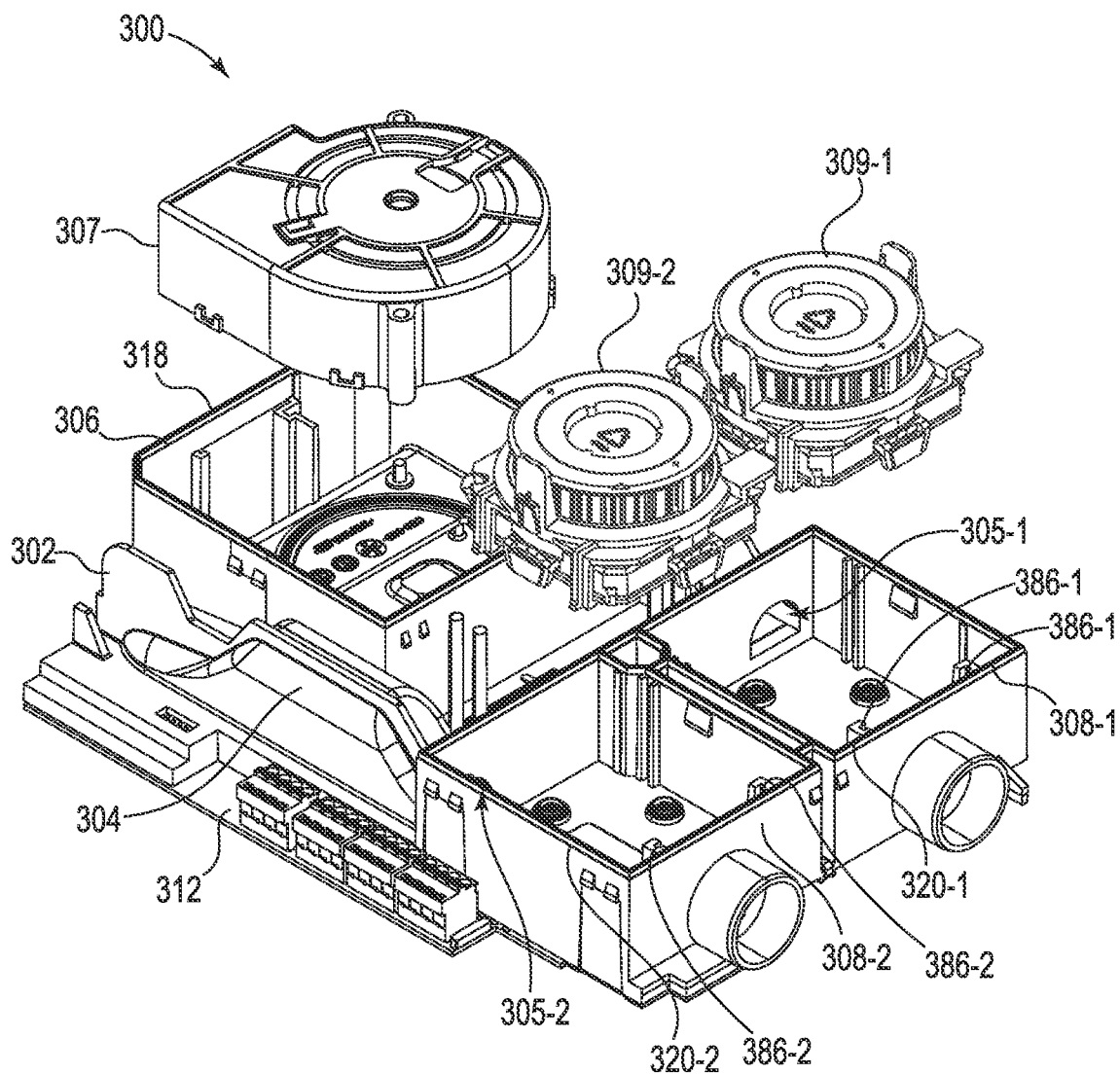
FIG. 3 is an exploded view of an example of a manifold, a blower, and sensor heads of an aspirating smoke detector device in accordance with one or more embodiments of the present disclosure.

FIG. 3 is an exploded view of an example of a manifold 302, a blower 307, and sensor heads 309 of an aspirating smoke detector device 300, in accordance with one or more embodiments of the present disclosure. The aspirating smoke detector device 300 can include a manifold 302.

As previously described in connection with FIG. 1, the aspirating smoke detector device 300 can include a manifold 302, the manifold including a flow path 304, a blower housing 306, a first sensor head housing 308-1, and a second sensor head housing 308-2. The first sensor head housing 308-1 can include a first slot component 386-1. The second sensor head housing 308-2 can include a second slot component 386-2. The manifold 302 can cover the PCB 312 The flow path 304 can include the first flow channel 305-1 and the second flow channel 305-2.

As illustrated in FIG. 3, the manifold 302 can include the blower housing 306. The blower housing 306 is configured to receive the blower 307. As used herein, the term "blower" refers to a mechanical device for moving gas in a particular direction. For example, the blower 307 can be utilized to move gas through the aspirating smoke detector device 300. The blower 307 can, in some instances, comprise a ducted housing having a fan that, when spinning, causes gas (e.g., such as air) to flow in a particular direction.

The blower housing 306 is configured to receive the blower 307 when the blower 307 is oriented in a particular configuration. For example, the blower housing 306 can be designed such that the blower 307 can fit into the blower housing 306 in a single orientation. This can prevent the blower 307 from being installed in the blower housing 306 in an incorrect orientation.

The blower housing 306 can include a blower cover gasket 318. The blower cover gasket 318 can be formed on the blower housing 306 by, for instance, molding techniques. The blower cover gasket 318 can be, for example, a thermoplastic rubber gasket, among other examples.

The manifold 302 can additionally include the first sensor head housing 308-1. The first sensor head housing 308-1 can be connected to the blower housing 306 via the first flow channel 305-1 and can receive a first sensor head 309-1. As used herein, the term "sensor head" refers to a device to detect events and/or changes in its environment and transmit the detected events and/or changes for processing and/or analysis. For example, the sensor heads 309 can be utilized to detect smoke particles in gas transiting through the aspirating smoke detector device 300. In some examples, the first sensor head 309-1 can be a nephelometer (e.g., an aerosol photometer) to measure the concentration of smoke particles in a gas by utilizing light scattered by smoke particles. However, the first sensor head 309-1 can be any other type of smoke detection sensor that detects smoke utilizing gas transiting through the aspirating smoke detector device 300.

The first sensor head housing 308-1 can be configured to receive a first sensor head 309-1. That is, the first sensor head housing 308-1 is configured to receive the first sensor head 309-1 when the first sensor head 309-1 is oriented in a particular configuration. For example, the first sensor head housing 308-1 can be designed such that the first sensor head 309-1 can fit into the first sensor head housing 308-1 in a single orientation. This can prevent the first sensor head 309-1 from being installed in the first sensor head housing 308-1 in an incorrect orientation.

The first sensor head housing 308-1 can include a first sensor head housing cover gasket 320-1. The first sensor head housing cover gasket 320-1 can be formed on the first sensor head housing 308-1 by, for instance, molding techniques. The first sensor head housing cover gasket 320-1 can be, for example, a thermoplastic rubber gasket, among other examples.

Similar to the first sensor head housing 308-1, the second sensor head housing 308-2 can be connected to the blower housing 306 via the second flow channel 305-2 and can receive a second sensor head 309-2. The second sensor head 309-2 can be a nephelometer or any other type of smoke detection sensor that detects smoke utilizing gas transiting through the aspirating smoke detector device 300. Additionally, the second sensor head housing 308-2 can be configured to receive the second sensor head 309-2. That is, the second sensor head housing 308-2 is configured to receive the second sensor head 309-2 when the second sensor head 309-2 is oriented in a particular configuration. For example, the second sensor head housing 308-2 can be designed such that the second sensor head 309-2 can fit into the second sensor head housing 308-2 in a single orientation. This can prevent the second sensor head 309-2 from being installed in the second sensor head housing 308-2 in an incorrect orientation.

The second sensor head housing 308-2 can include a second sensor head housing cover gasket 320-2. The second sensor head housing cover gasket 320-2 can be formed on the second sensor head housing 308-2 by, for instance, molding techniques. The second sensor head housing cover gasket 320-2 can be, for example, a thermoplastic rubber gasket, among other examples.

Figure 4:
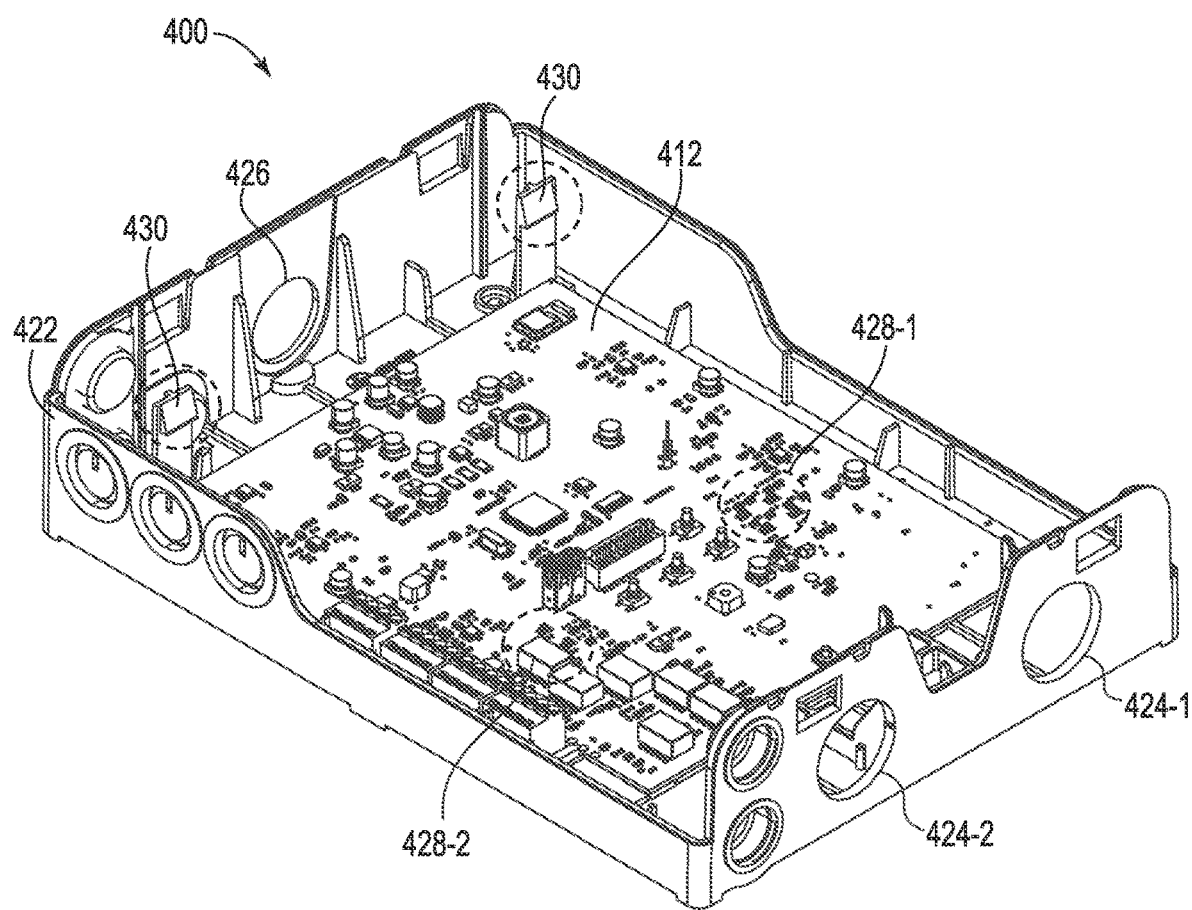
FIG. 4 is perspective view of an example of a housing and a PCB of an aspirating smoke detector device in accordance with one or more embodiments of the present disclosure.

FIG. 4 is perspective view of an example of a housing 422 and a PCB 412 of an aspirating smoke detector device 400, in accordance with one or more embodiments of the present disclosure. The housing 422 can house the PCB 412, as is further described herein.

As illustrated in FIG. 4, the aspirating smoke detector device 400 can include a housing 422. As used herein, the term "housing" refers to an outer shell of a device. The housing 422 can be a "rear" housing of the aspirating smoke detector device 400 which can house the PCB 412. For example, the housing 422 can retain the PCB 412 after assembly of the aspirating smoke detector device 400. The PCB 412 can include LEDs 428-1 and 428-2. The LEDs 428-1 can be in a 2×2 array configuration to correspond with the 2×2 array configuration of the light pipes (e.g., light pipes 114-1, previously described in connection with FIG. 1) and the LEDs 428-2 can be in a 1×1 array configuration to correspond with the 1×1 array configuration of the light pipes (e.g., light pipes 114-2, previously described in connection with FIG. 1).

Although not illustrated in FIG. 4 for clarity and so as not to obscure embodiments of the present disclosure, the housing 422 can include a fastening mechanism. The fastening mechanism can retain the PCB 412 in the housing 422. The fastening mechanism can be, for example, a clamp(s), a snap clip, a mechanical fastener (e.g., a bolt, screw, etc.), among other types of fastening mechanisms.

Additionally, although not illustrated in FIG. 4 for clarity and so as not to obscure embodiments of the present disclosure, the housing 422 can include mounting locations. The mounting locations can include, for instance, a hole through which a fastener can secure the aspirating smoke detector device 400 to a wall or other object. The fastener can be secured to the wall or other object and slipped through the hole of the mounting location such that the housing 422 can rest on the fastener to mount the aspirating smoke detector device 400 to the wall or other object.

The housing 422 can include a first housing inlet 424-1, a second housing inlet 424-2, and a housing outlet 426. The first housing inlet 424-1, the second housing inlet 424-2, and the housing outlet 426 can be apertures in the structure of the housing 422. The first housing inlet 424-1 can receive a first sensor head housing inlet, the second housing inlet 424-2 can receive a second sensor head housing inlet, and the housing outlet 426 can receive a blower housing outlet, as is further described in connection with FIG. 5.

As illustrated in FIG. 4, the housing 422 can further include snap clips 430. As used herein, the term "snap clip" refers to a fastening mechanism including a protruding flange having an engagement tooth. The snap clips 430 can be deflected when an object to be secured is inserted adjacent to the snap clips 430 and an engagement tooth of each of the snap clips can engage with a surface of the object to secure the object, as is further described in connection with FIG. 5.

Figure 5:
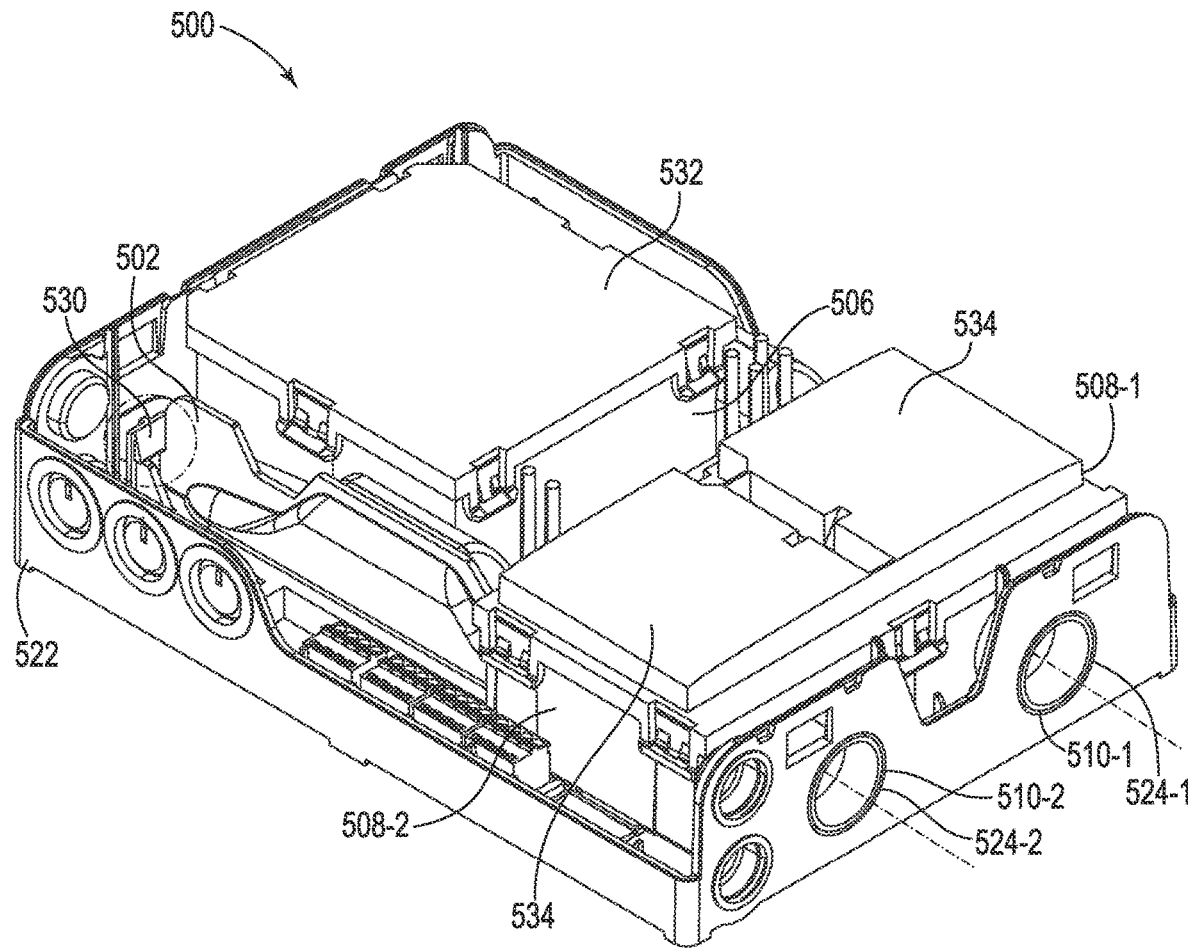
FIG. 5 is a perspective view of an example of a housing and a manifold of an aspirating smoke detector device having a blower housing cover and sensor head housing covers in accordance with one or more embodiments of the present disclosure.

FIG. 5 is a perspective view of an example of a housing 522 and a manifold 502 of an aspirating smoke detector device 500 having a blower housing cover 532 and sensor head housing cover 534, in accordance with one or more embodiments of the present disclosure. The manifold 502 can include a blower housing 506 and sensor head housings 508.

In the embodiment illustrated in FIG. 5, the aspirating smoke detector device 500 can be partially assembled. For example, the manifold 502 can be connected to the housing 522 via a snap clip (e.g., snap clip 430, previously described in connection with FIG. 4). The snap clip can be deflected when the manifold 502 is inserted into the housing 522 and an engagement tooth of the snap clip can engage with a surface of the manifold 502 to connect the manifold 502 to the housing 522.

When the manifold 502 is connected to the housing 522, the first sensor head housing inlet 510-1 can be coaxially located with the first housing inlet 524-1. Additionally, the second sensor head housing inlet 510-2 can be coaxially located with the second housing inlet 524-2. Further, although not illustrated in FIG. 5 for clarity and so as not to obscure embodiments of the present disclosure, a blower housing outlet (e.g., blower housing outlet 636, as is further described in connection with FIG. 6) can be coaxially located with the housing outlet (e.g., housing outlet 426, previously described in connection with FIG. 4). Accordingly, gas can flow into the aspirating smoke detector device 500 via the first sensor head housing inlet 510-1 and/or the second sensor head housing inlet 510-2, to the sensor heads located in the sensor head housings 508, through the flow channels, and out the blower housing outlet, during which time the sensor heads can determine whether the gas includes smoke particles.

In order to ensure the gas flowing through the aspirating smoke detector device 500 is not mixed with gas located outside the aspirating smoke detector device 500, the various housings comprising the manifold 502 can be fluidically sealed. For example, the blower housing 506 can receive a blower housing cover 532. As previously described in connection with FIG. 3, the blower housing 506 can include a cover gasket (e.g., blower cover gasket 318, previously described in connection with FIG. 3). When the blower housing cover 532 is connected to the blower housing 506, the blower cover gasket can fluidically seal the blower housing 506 to the blower housing cover 532.

Similar to the blower housing 506, the first sensor head housing 508-1 and the second sensor head housing 508-2 can receive a sensor head housing cover 534 to cover the first sensor head and the second sensor head respectively located therein. As previously described in connection with FIG. 3, the first sensor head housing 508-1 and the second sensor head housing 508-2 can include a cover gasket (e.g., first sensor head housing cover gasket 320-1, previously described in connection with FIG. 3). When the sensor head housing cover 534 is connected to the first sensor head housing 508-1 and the second sensor head housing 508-2, the sensor head housing cover gasket can fluidically seal the first sensor head housing 508-1 and the second sensor head housing 508-2 to the sensor head housing cover 534.

Figure 6:
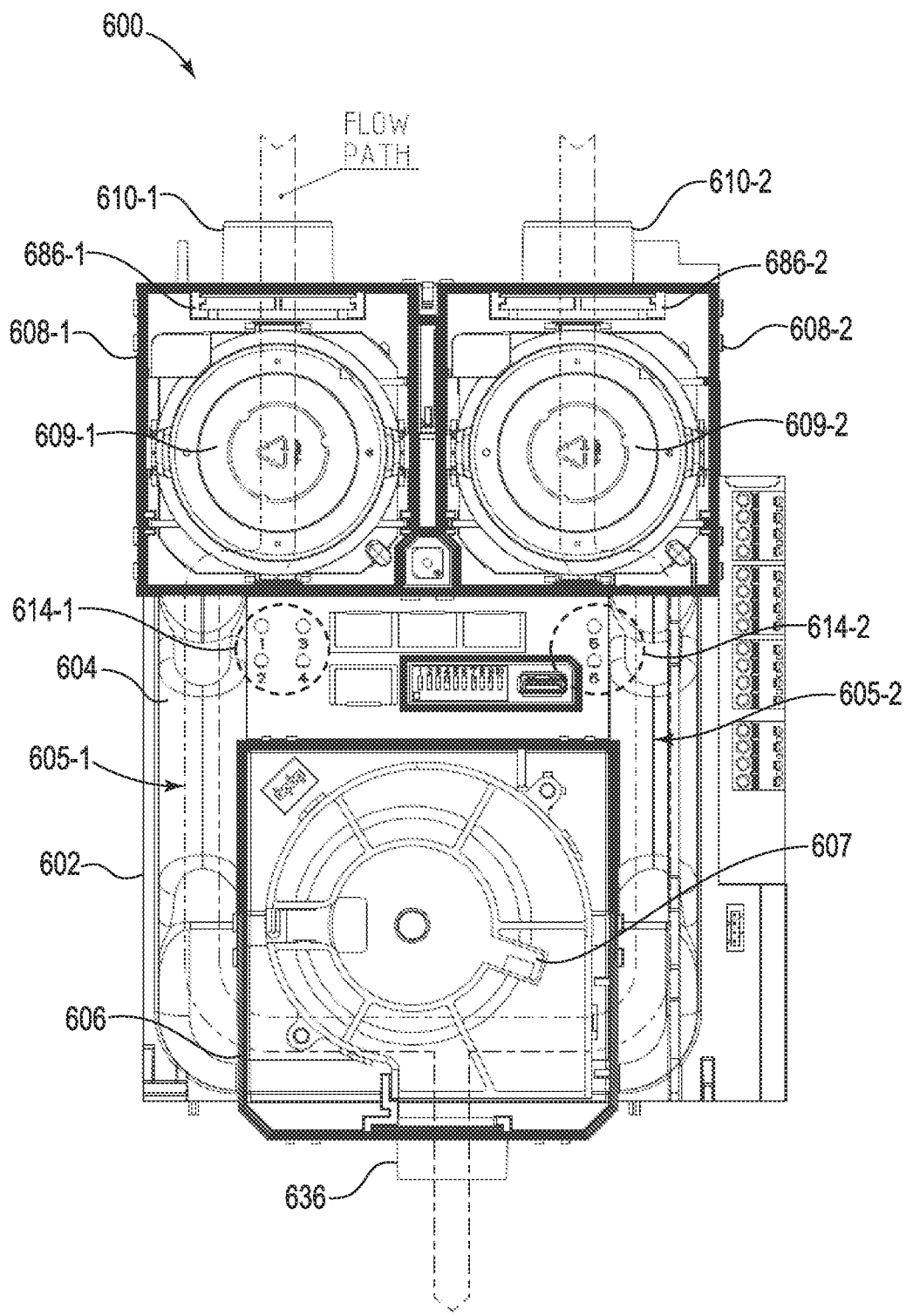
FIG. 6 is a front view of an example of a manifold of an aspirating smoke detector device having flow channels in accordance with one or more embodiments of the present disclosure.

FIG. 6 is a front view of an example of a manifold 602 of an aspirating smoke detector device 600 having flow channels 605, in accordance with one or more embodiments of the present disclosure. The manifold 602 can include a first sensor head housing 608-1, a second sensor head housing 608-2, and a blower housing 606. The first sensor head housing 608-1 can include a first sensor head 609-1 and a first sensor head housing inlet 610-1. The second sensor head housing 608-2 can include a second sensor head 609-2 and a second sensor head housing inlet 610-2. The first sensor head housing 608-1 can include a first slot component 686-1. The second sensor head housing 608-2 can include a second slot component 686-2. The blower housing 606 can include a blower 607.

When the blower 607 is operating, gas can flow through the aspirating smoke detector device 600 as indicated in FIG. 6. Gas (e.g., such as air from a space in a facility) can enter the aspirating smoke detector device 600 via the first sensor head housing inlet 610-1 and/or the second sensor head housing inlet 610-2 for smoke particle detection by the first sensor head 609-1 located in the first sensor head housing 608-1 and/or the second sensor head 609-2 located in the second sensor head housing 608-2. Before reaching the first sensor head 609-1 and/or the second sensor head 609-2, gas can pass through a first filter (not shown in FIG. 6 so as not to obscure embodiments herein) located in the first slot component 686-1 and/or a second filter (not shown in FIG. 6 so as not to obscure embodiments herein) located in the second slot component 686-2. A filter, as referred to herein, can include one or more materials known to those of skill in the art that filter out dust and/or debris from the gas entering the first sensor head housing inlet 610-1 and/or the second sensor head housing inlet 610-2. For instance, in some embodiments, filters can include wire mesh filters, woven filters, nonwoven filters, etc.

Following smoke particle detection by the first sensor head 609-1 and/or the second sensor head 609-2, the gas can travel through the first flow channel 605-1 and/or the second flow channel 605-2 and exit the aspirating smoke detector device 600 via the blower housing outlet 636.

As previously described herein, the aspirating smoke detector device 600 can include a PCB. The PCB can include LEDs that can light up during operation of the aspirating smoke detector device 600 in order to indicate certain information about the operation of the aspirating smoke detector device 600. Further, as previously described herein, the manifold 602 can further include light pipes 614-1 (e.g., in the 2×2 array configuration) and 614-2 (e.g., in the 1×1 array configuration). The manifold 602 can be positioned over the PCB and cover a portion of the PCB such that the light pipes 614 are oriented above the LEDs included on the PCB. The light pipes 614 can be of a transparent material to allow for the light emitted by the LEDs to be transmitted through the light pipes 614 when a cover (e.g., cover 844, as is further described in connection with FIG. 8) is connected to the manifold 602. The light pipes 614 can be, for example, of a transparent acrylic material, although embodiments of the present disclosure are not so limited. Accordingly, the light emitted by the LED can be visible when the aspirating smoke detector device 600 is operational.

Figure 7:
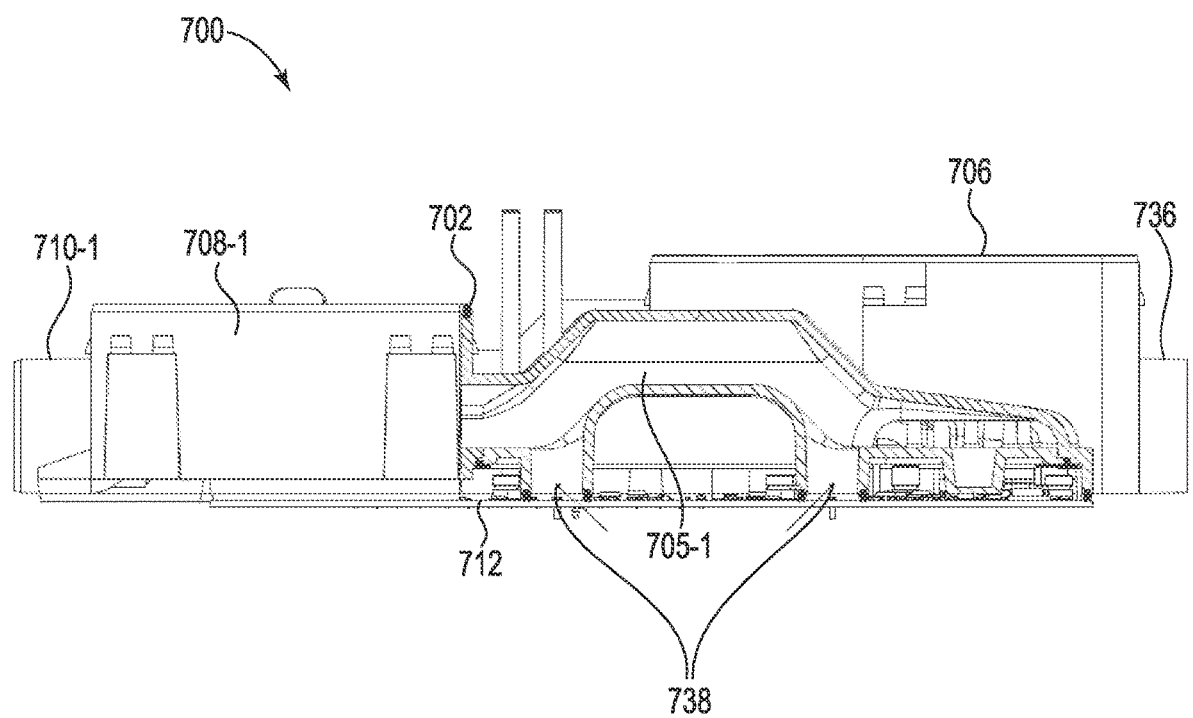
FIG. 7 is a side section view of an example of a manifold having a flow channel and a PCB having a pair of ultrasonic sensors in accordance with one or more embodiments of the present disclosure.

FIG. 7 is a side section view of an example of a manifold 702 having a flow channel 705-1 and a PCB 712 having a pair of ultrasonic sensors 738, in accordance with one or more embodiments of the present disclosure. The manifold 702 can include a first sensor head housing 708-1, and a blower housing 706.

The first sensor head housing 708-1 can be fluidically connected to the blower housing 706 via the first flow channel 705-1. Further, although not illustrated in FIG. 7 for clarity and so as not to obscure embodiments of the present disclosure, the second sensor head housing (e.g., second sensor head housing 108-2, 308-2, 508-2, and 608-2, previously described in connection with FIGS. 1, 3, 5, and 6, respectively) can be fluidically connected to the blower housing 706 via a second flow channel (e.g., second flow channel 105-2, 305-2, 605-2, previously described in connection with FIGS. 1, 3, and 6, respectively).

The first flow channel 705-1 and the second flow channel can include constant cross-sectional dimensions. For example, the first flow channel 705-1 and the second flow channel can include constant cross-sectional dimensions (e.g., a constant radius/constant diameter) through a length of the first flow channel 705-1 and the second flow channel. The constant cross-sectional dimensions of the first flow channel 705-1 and the second flow channel can help to reduce speed variation and distribution in the flow of the gas through the first flow channel 705-1 and the second flow channel, which can help to increase performance of the blower included in the blower housing 706, as compared with previous approaches.

The PCB 712 can include a pair of ultrasonic sensors 738 exposed in the first flow channel 705-1. Further, although not illustrated in FIG. 7 for clarity and so as not to obscure embodiments of the present disclosure, the PCB 712 can include another pair of ultrasonic sensors exposed in a similar location in the second flow channel as the pair of ultrasonic sensors 738 in the first flow channel 705-1. As used herein, the term "ultrasonic sensor" refers to an electronic component used for measuring the time needed by ultrasonic waves to cover a distance between the sensor and a target, where the target can be another ultrasonic sensor. Using the time of travel (forward and backward) between the pair of ultrasonic sensors, a flow rate of a gas can be measured flowing through the aspirating smoke detector device 700.

The pair of ultrasonic sensors 738 can measure a gas flow rate of the gas through the aspirating smoke detector device 700. Measuring the gas flow rate of the gas through the aspirating smoke detector device 700 via the pair of ultrasonic sensors 738 can allow for calibration of the blower, as well as ensuring a constant air flow through the aspirating smoke detector device 700.

Figure 8:
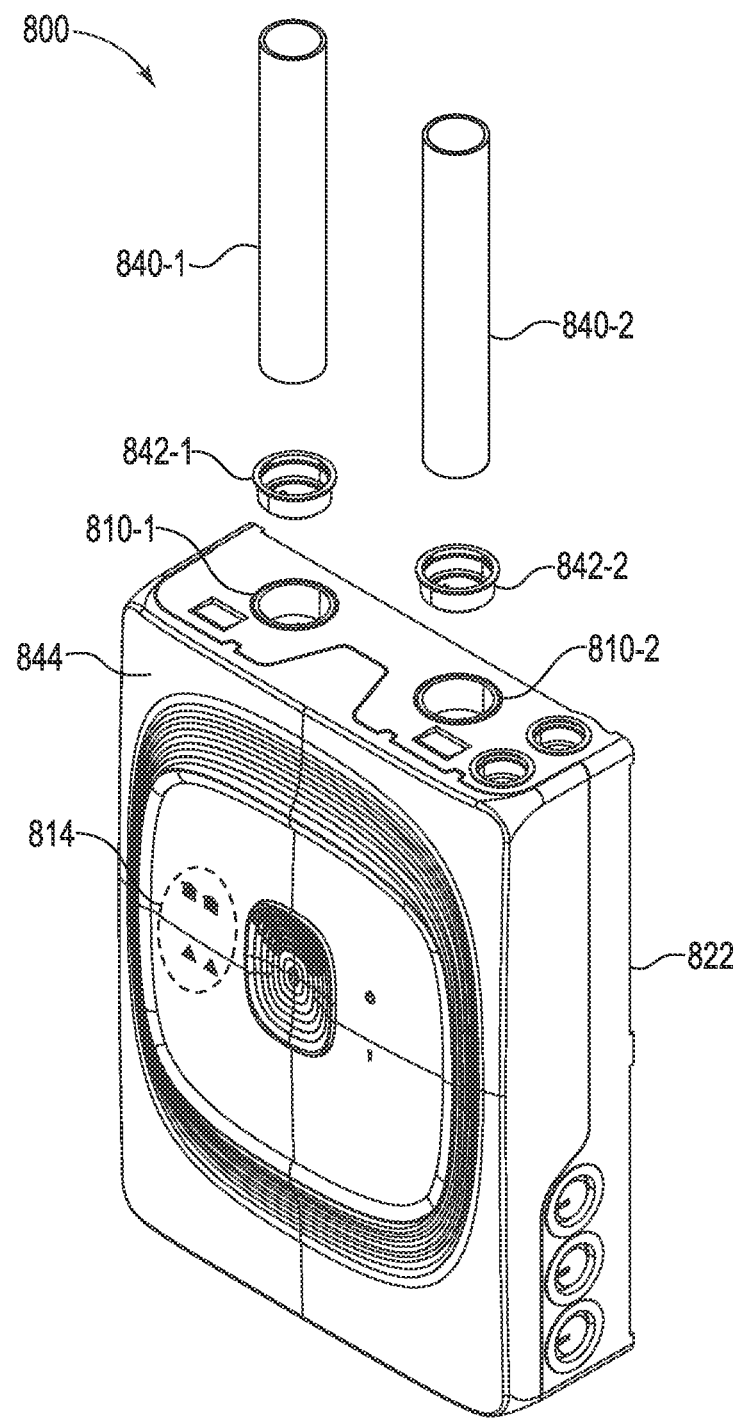
FIG. 8 is an exploded perspective view of an example of an aspirating smoke detector device having inlet pipes in accordance with one or more embodiments of the present disclosure.

FIG. 8 is an exploded perspective view of an example of an aspirating smoke detector device 800 having inlet pipes 840, in accordance with one or more embodiments of the present disclosure. The aspirating smoke detector device 800 can include a housing 822 and a cover 844.

As illustrated in FIG. 8, the aspirating smoke detector device 800 can be nearly fully assembled. The cover 844 (e.g., a "front" cover) can be connected to the housing 822 via snap clip(s). When the cover 844 is connected to the housing 822, the light pipes 814 allow for illumination from the LEDs included on a PCB in the aspirating smoke detector device 800 to be seen when the aspirating smoke detector device 800 is assembled.

The first housing inlet 824-1 can be connected to a first inlet pipe 840-1 via a first inlet adapter 842-1. Additionally, the second housing inlet 824-2 can be connected to a second inlet pipe 840-2 via a second inlet adapter 842-2. For example, when installed, the aspirating smoke detector device 800 can draw gas from a location in a facility through a piping network to the aspirating smoke detector device 800 for smoke detection. The piping network can include the first inlet pipe 840-1 and/or the second inlet pipe 840-2, which can be connected to the aspirating smoke detector device 800 via the first inlet adapter 842-1 and/or the second inlet adapter 842-2, respectively.

The first inlet adapter 842-1 and the second inlet adapter 842-2 can be "breakable". If the first inlet pipe 840-1 and the second inlet pipe 840-2 are 25 millimeter (mm) diameter pipes, the first inlet adapter 842-1 and the second inlet adapter 842-2 can be used to accommodate the 25 mm inlet pipes 840. If the first inlet pipe 840-1 and the second inlet pipe 840-2 are 27 mm diameter pipes, the inlet adapters 842 can be removed to accommodate the 27 mm inlet pipes 840. The first inlet adapter 842-1 and the second inlet adapter 842-2 can accordingly allow for the accommodation of differently sized piping networks which may vary based on different facilities, different jurisdictions, etc., allowing for ease of installation in different facilities in different locations. As such, the first inlet adapter 842-1 can fluidically seal the first inlet pipe 840-1 and the first sensor head housing inlet 810-1 and the second inlet adapter 842-2 can fluidically seal the second inlet pipe 840-2 and the second sensor head housing inlet 810-2.

Figure 9A:
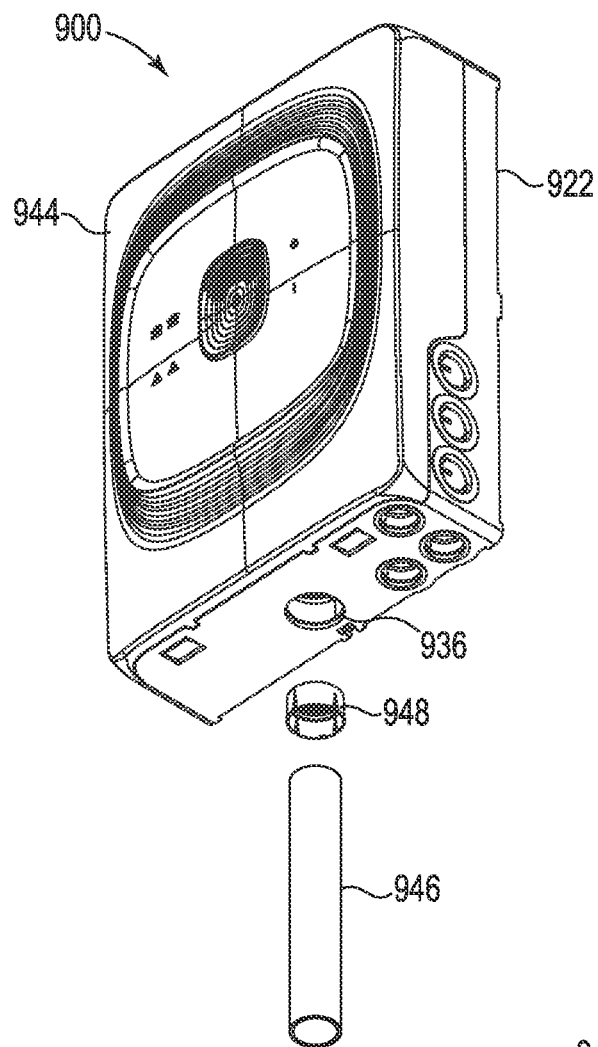
FIG. 9A is an exploded perspective view of an example of an aspirating smoke detector device having an exhaust pipe and an outlet adapter in accordance with one or more embodiments of the present disclosure.

FIG. 9A is an exploded perspective view of an example of an aspirating smoke detector device 900 having an exhaust pipe 946 and an outlet adapter 948, in accordance with one or more embodiments of the present disclosure. The aspirating smoke detector device 900 can include the cover 944 connected to the housing 922.

As illustrated in FIG. 9A, the blower housing outlet 936 can be connected to an exhaust pipe 946 via an outlet adapter 948. The gas exiting the aspirating smoke detector device 900 can do so through the exhaust pipe 946.

As illustrated in FIG. 9A, the outlet adapter 948 can be oriented to receive the exhaust pipe 946. That is, the exhaust pipe 946 can be connected to the outlet adapter 948 by inserting the exhaust pipe 946 into the outlet adapter 948. A mesh screen included on the outlet adapter 948 can point "inwards" and prevent particulate or other objects from exiting or entering the aspirating smoke detector device 900 via the blower housing outlet 936.

Figure 9B:
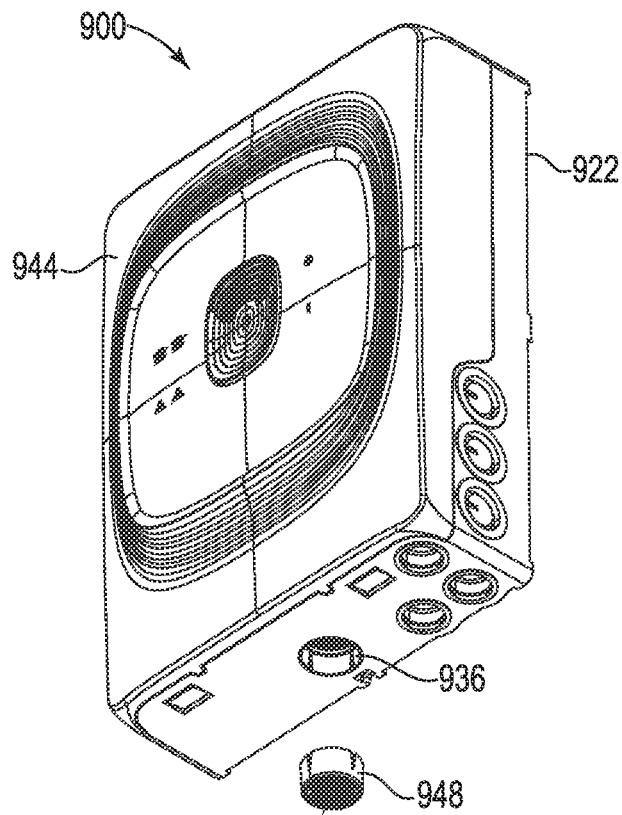
FIG. 9B is an exploded perspective view of an example of an aspirating smoke detector device having an outlet adapter in accordance with one or more embodiments of the present disclosure.

FIG. 9B is an exploded perspective view of an example of an aspirating smoke detector device 900 having an outlet adapter 948, in accordance with one or more embodiments of the present disclosure. The aspirating smoke detector device 900 can include the cover 944 connected to the housing 922.

As illustrated in FIG. 9B, the blower housing outlet 936 can be connected to an outlet adapter 948. The gas exiting the aspirating smoke detector device 900 can do so through the outlet adapter 948.

The outlet adapter can be connected to the blower housing outlet 936 by inserting the outlet adapter 948 into the blower housing outlet 936. A mesh screen included on the outlet adapter 948 can point "outwards" and prevent particulate or other objects from exiting or entering the aspirating smoke detector device 900 via the blower housing outlet 936. In such a manner, the outlet adapter 948 can function as a mesh plug. The outlet adapter 948 can be oriented as illustrated in FIG. 9B in an embodiment in which the aspirating smoke detector device 900 is not connected to an exhaust pipe (e.g., exhaust pipe 946, previously described in connection with FIG. 9A).

Figure 10:
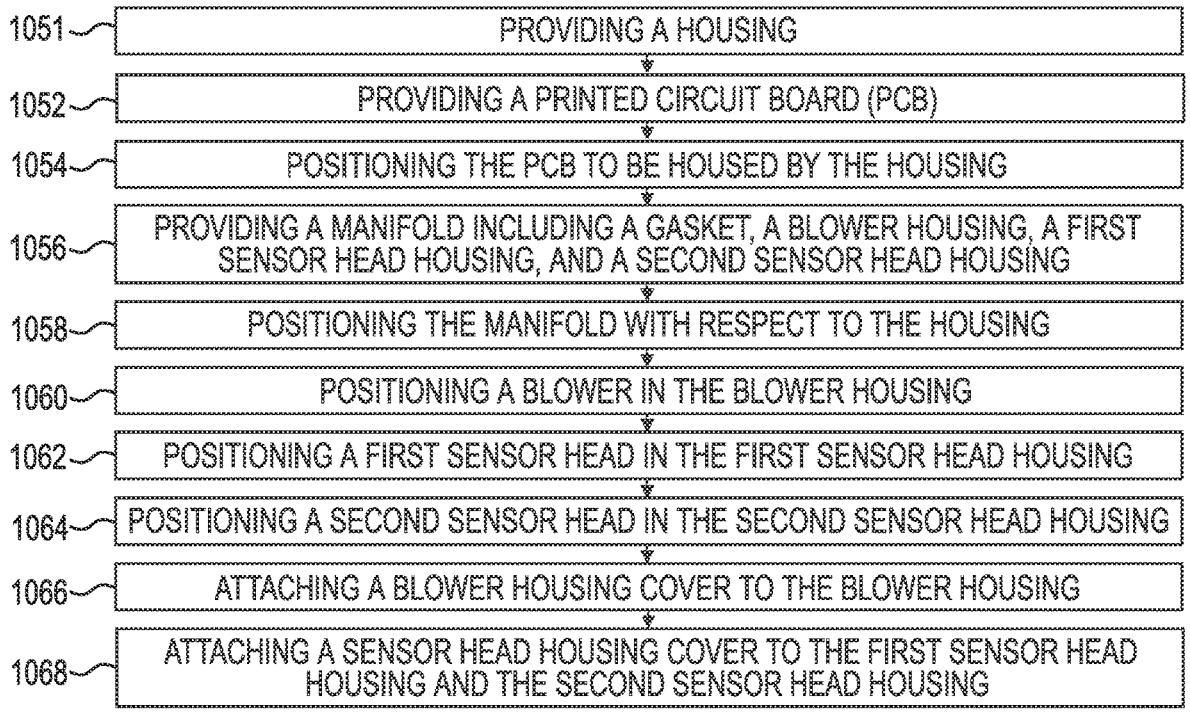
FIG. 10 is an example of a method of manufacturing of an aspirating smoke detector device in accordance with one or more embodiments of the present disclosure.

FIG. 10 is an example of a method 1050 of manufacturing of an aspirating smoke detector device, in accordance with one or more embodiments of the present disclosure. At 1051, the method includes providing a housing. The housing can be a "rear" housing that can house a PCB and include snap clips to connect various parts of the aspirating smoke detector device thereto. The housing can be molded, cast, three-dimensionally (3D) printed, etc.

At 1052, the method 1050 includes providing a PCB. The PCB can include electrical components utilized in detection of smoke via the aspirating smoke detector device, such as LEDs, switches, buttons, pairs of ultrasonic sensors, as well as processing and memory resources, among other electrical components.

At 1052, the method includes positioning the PCB to be housed by the housing. For example, the PCB can be positioned and attached to the housing.

At 1056, the method 1050 includes providing a manifold including a gasket, a first flow channel and a second flow channel, a blower housing, a first sensor head housing, and a second sensor head housing. The manifold can be provided using multi-shot molding techniques. Multiple material types can be utilized in a single mold at one time, including ABS plastic, PMMA plastic, and TPE elastomers, among other materials, in order to provide the manifold. Further, the method 1050 can include an in-mold assembling procedure in conjunction with ultrasonic welding directly in the single-shot molding tool to provide the manifold. Further, the method 1050 can include over-molding the gasket to the manifold, another gasket to the blower housing, and a further gasket to the first and second sensor head housings. The gaskets can be, for example, thermoplastic rubber gaskets, among other examples.

At 1058, the method 1050 includes positioning the manifold with respect to the housing. The manifold can be positioned with respect to the housing such that the gasket interfaces with and compresses against the PCB to fluidically seal the manifold to the PCB.

At 1060, the method 1050 includes positioning a blower in the blower housing. The blower housing can be shaped such that the blower has to be oriented in a particular configuration in order to be received by the blower housing. This can prevent the blower from being positioned/installed in the blower housing in an incorrect orientation and ensures the correct orientation of the blower in the blower housing.

At 1062, the method 1050 includes positioning a first sensor head in the first sensor head housing such that the first sensor head is secured in the first sensor head housing. The first sensor head housing can be shaped such that the first sensor head also has to be oriented in a particular configuration in order to be received by the first sensor head housing.

At 1064, the method 1050 includes positioning a second sensor head in the second sensor head housing such that the second sensor head is secured in the second sensor head housing. The second sensor head housing can be shaped such that the second sensor head also has to be oriented in a particular configuration in order to be received by the second sensor head housing.

At 1066, the method 1050 can include attaching a blower housing cover to the blower housing. The blower housing cover can fluidically seal, via the blower housing gasket, the blower housing in response to attaching the blower housing cover to the blower housing. Since the blower is not secured in the blower housing by a snap clip, the blower housing cover can secure the blower in the blower housing.

At 1068, the method 1050 can include attaching a sensor head housing cover to the first sensor head housing and the second sensor head housing. The sensor head housing cover can fluidically seal, via the first sensor head housing gasket and the second sensor head housing gasket, the first sensor head housing and the second sensor head housing.

Lastly, the method 1050 can include providing an additional "front" cover. The "front" cover can be attached to the "rear" cover to complete assembly of the aspirating smoke detector device.

Figure 11A:
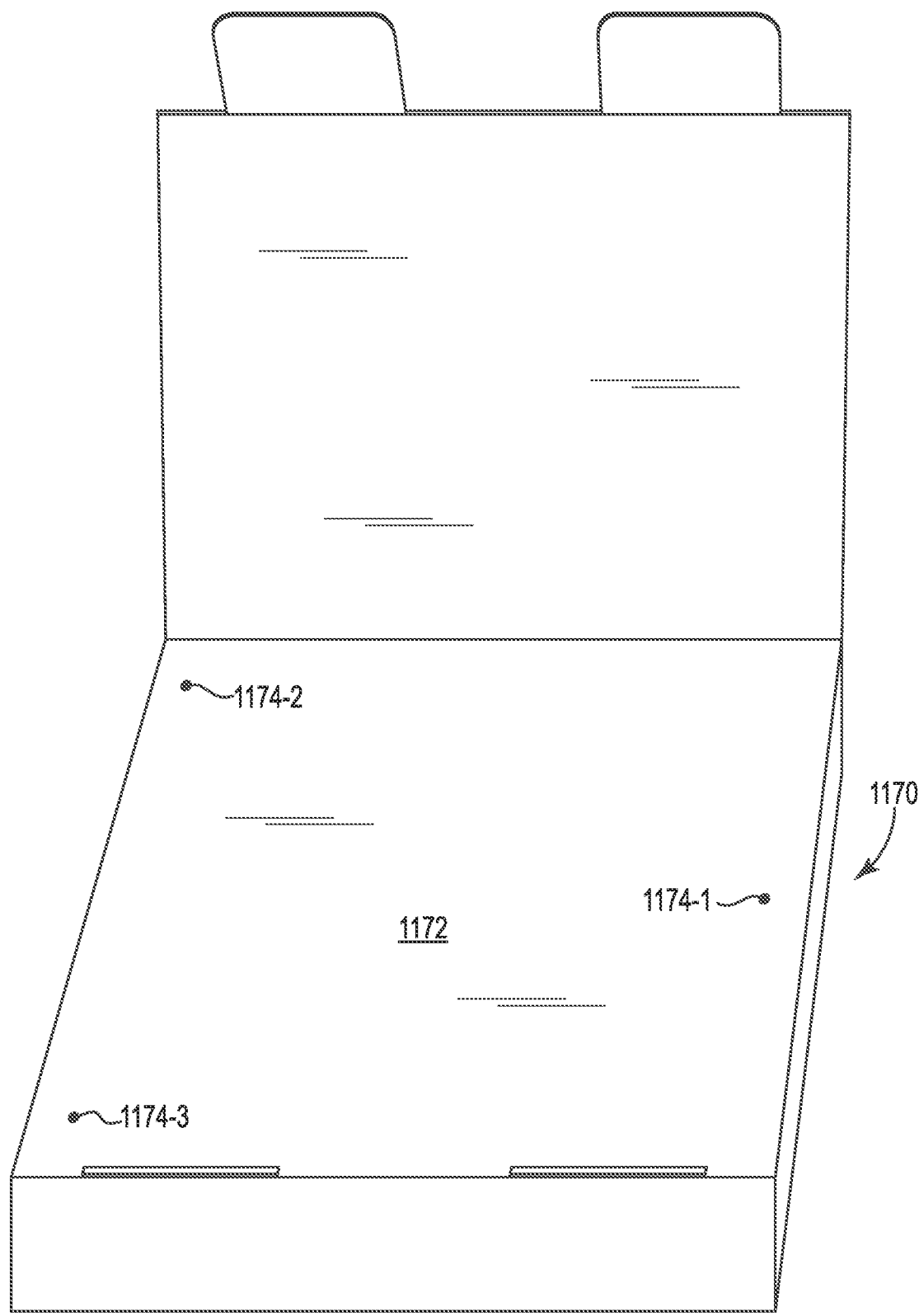
FIG. 11A is a perspective view of an example aspirating smoke detector device package in accordance with one or more embodiments of the present disclosure.
Figure 11B:
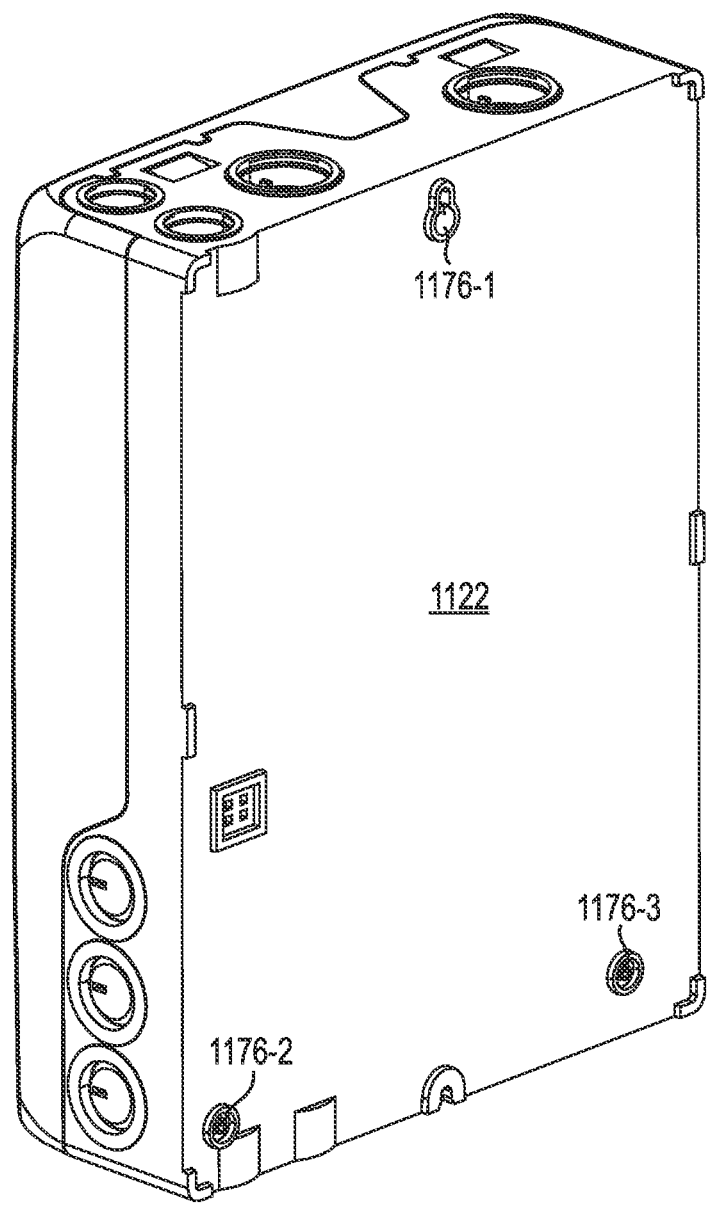
FIG. 11B is a rear view of an example of a housing of an aspirating smoke detector device in accordance with one or more embodiments of the present disclosure.

FIG. 11A is a perspective view of an example aspirating smoke detector device package 1170 in accordance with one or more embodiments of the present disclosure. FIG. 11B is a rear view of an example of a housing 1122 of an aspirating smoke detector device in accordance with one or more embodiments of the present disclosure. FIG. 11A and FIG. 11B may be cumulatively referred to as "FIG. 11."

The package 1170 can be made from cardboard, boxboard, containerboard, chipboard, combined board, corrugated board, fiberboard, polymer(s) and/or other suitable packaging material(s). In some embodiments, the package 1170 is a carton (e.g., box) including a plurality of panels. A panel can refer to a side, a top, a bottom, a tongue, and/or other parts of a package. The particular configuration of the panels can be any suitable configuration and/or geometry. For instance, the package 1170 can be a 1-2-3 bottom snap lock carton, a six corner tray, an airplane style straight tuck carton, an airplane tuck end box, a four corner brightwood tray, a tongue & tuck carton, a tuck top auto lock bottom box, a tuck top snap lock bottom box, a rigid box, a regular slotted container (RSC), a half slotted container (HSC), an overlap slotted container (OSC), etc.

As shown in FIG. 11, the package 1170 can include a first panel 1172 having a mounting template. The mounting template can include a number of mounting indicators. For instance, as shown in the example illustrated in FIG. 11, the mounting template includes a first mounting indicator 1174-1, a second mounting indicator 1174-2, and a third mounting indicator 1174-3 (referred to cumulatively as "mounting indicators 1174"). It is noted that while three mounting indicators 1174 are shown in the example illustrated in FIG. 11, embodiments herein are not so limited and other quantities of mounting indicators are in accordance with the present disclosure; for example, the example package 1570 illustrated in FIG. 15 includes four mounting indicators.

The mounting indicators 1174 correspond to a number of mounting locations (cumulatively referred to as "mounting locations 1176") on the housing 1122. The first mounting indicator 1174-1 corresponds to a first mounting location 1176-1, the second mounting indicator 1174-2 corresponds to a second mounting location 1176-2, and the third mounting indicator 1174-3 corresponds to a third mounting location 1176-3. Each of the mounting locations 1176 can include a surface defining a hole through which a fastener can secure the aspirating smoke detector device to a wall (or other object). The fastener can be secured to the wall or other object and slipped through the hole of the mounting location such that the housing 1122 can rest on the fastener to mount the aspirating smoke detector device to the wall.

The panel 1172 can be kept on the package 1170 or removed from the package 1170. The panel 1172 can be placed on the wall where the smoke detector is desired. Mounting holes can be drilled into the wall according to the location of the mounting indicators 1174. Once the holes are drilled, the mounting locations 1176 can be aligned with the drilled holes and the smoke detector can be mounted using fasteners (e.g., screws). In some embodiments, the mounting indicators 1174 are printed indicia (e.g., circles, crosshairs, etc.) on the panel 1172 such that a drill bit can drill through the printed indicia and into the wall behind. In some embodiments, the mounting indicators 1174 are apertures defined by surfaces extending through the first panel such that a drill bit can be extended through the aperture during drilling.

Figure 12:
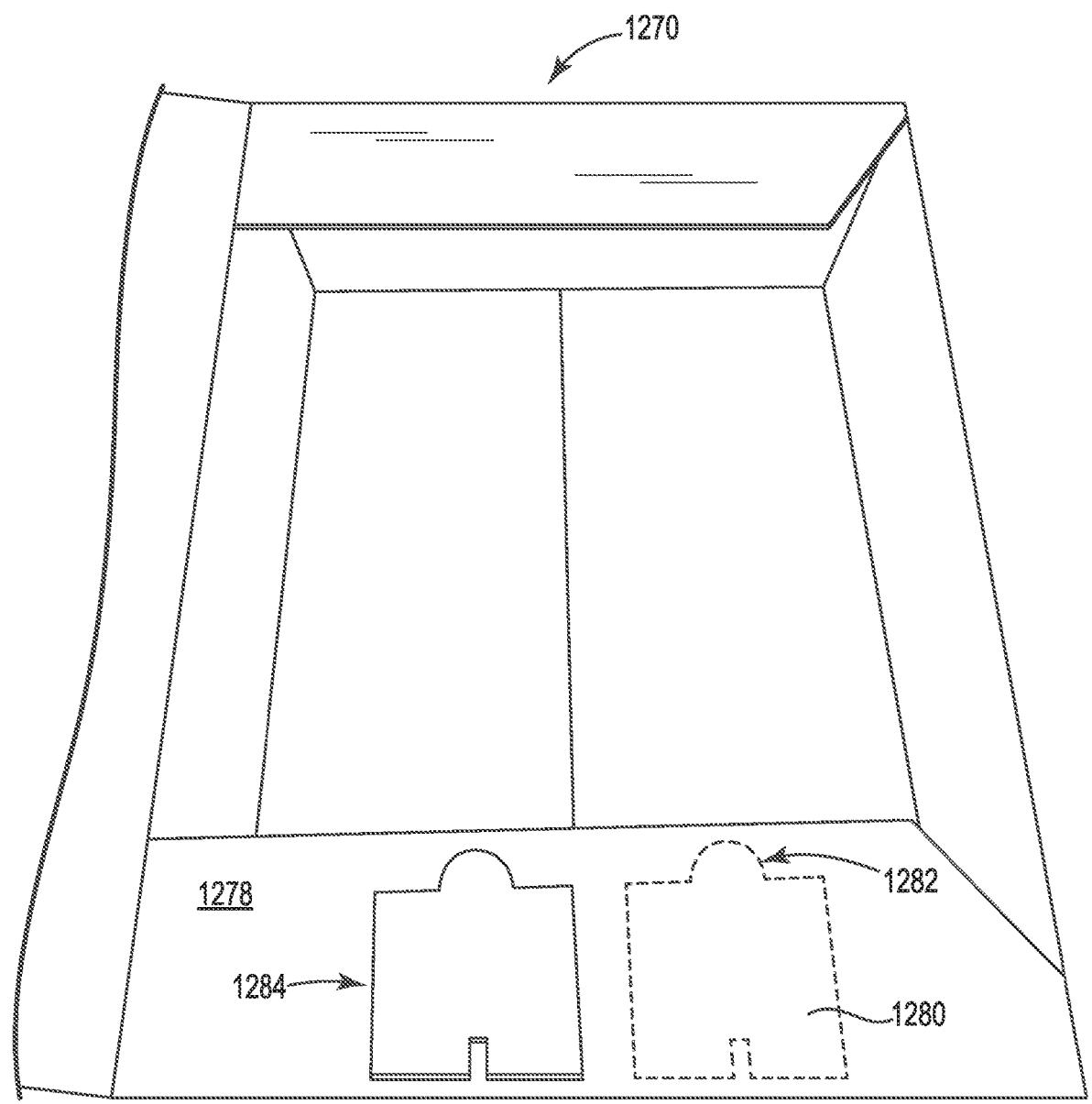
FIG. 12 is a perspective view of an example panel of a package of an aspirating smoke detector device including removable head protectors in accordance with one or more embodiments of the present disclosure.

FIG. 12 is a perspective view of an example panel 1278 of a package 1270 of an aspirating smoke detector device including removable head protectors 1280 in accordance with one or more embodiments of the present disclosure. In some embodiments, the panel 1278 is a different panel than the panel 1172, previously described in connection with FIG. 11. In some embodiments, the panel 1278 and the panel 1172 are a same panel.

As shown in FIG. 12, the panel 1278 includes a head protector 1280. The head protector 1280 can be removed from the panel 1278 and inserted into a slot of the aspirating smoke detector device (discussed further below in connection with FIG. 13). As shown in the example illustrated in FIG. 12, the panel 1278 included two head protectors. The head protector 1280 remains in the panel 1278 while a second head protector has been removed leaving a head protector vacancy 1284. It is noted that embodiments of the present disclosure do not limit a quantity of head protectors to a particular number.

The head protector 1280 can be defined by perforations in the panel 1278. The perforations can be made by any suitable manner allowing the head protector 1280 to be removed from the panel 1278 with little or no tools. For example, in some embodiments, the head protector 1280 is removable by hand. As shown in FIG. 12, the head protector 1280 includes a protrusion 1282. The protrusion 1282, which is also shown in FIG. 13, can allow the head protector 1280 to be gripped by a user even when the head protector is inserted in a slot component as described herein. Stated differently, the protrusion 1282 can protrude and/or extend from the aspirating smoke detector device when the head protector 1280 is inserted into the slot. The protrusion 1282 is shown as having a semicircular shape, though it is noted that embodiments of the present disclosure are not so limited.

Figure 13A:
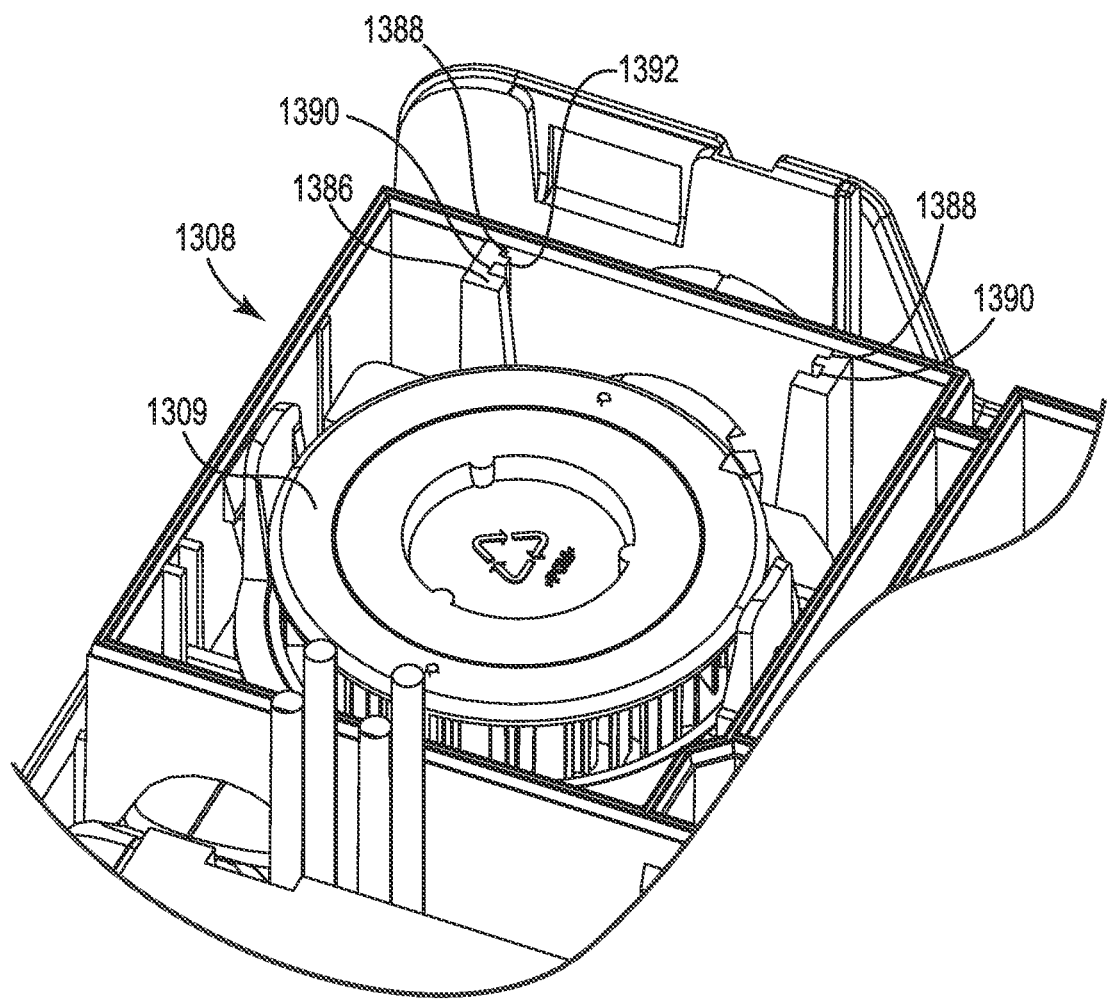
FIG. 13A is a detailed view of a sensor head housing having a slot component in accordance with one or more embodiments of the present disclosure.
Figure 13B:
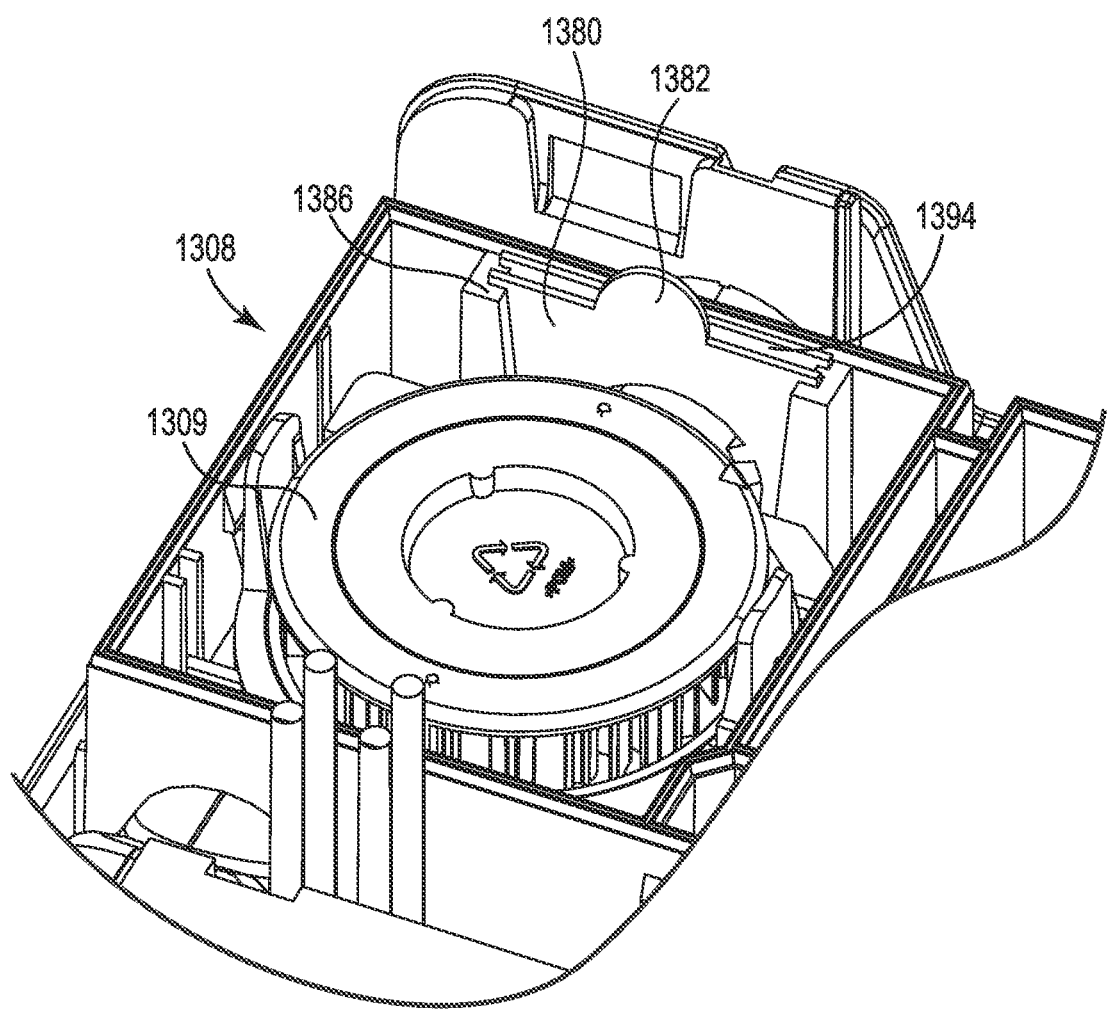
FIG. 13B is a detailed view of the sensor head housing having a filter and a head protector inserted into the slot component in accordance with one or more embodiments of the present disclosure.

FIG. 13A is a detailed view of a sensor head housing 1308 having a slot component 1386 in accordance with one or more embodiments of the present disclosure. FIG. 13B is a detailed view of the sensor head housing 1308 having a filter 1394 and a head protector 1380 inserted into the slot component 1386 in accordance with one or more embodiments of the present disclosure. FIG. 13A and FIG. 13B may be cumulatively referred to herein as "FIG. 13." As shown in FIG. 13, the sensor head 1309 is located within the sensor head housing 1308. The sensor head housing 1308 can include a slot component 1386. The slot component 1386 can include a pair of rails protruding inward and defining a slot. In some embodiments the slot component 1386 can define a first portion (e.g., a first slot) and a second portion (e.g., a second slot). As shown in the example illustrated in FIG. 13, the slot component 1386 includes a medial projection 1392 separating a first portion 1388 of the slot component 1386 from a second portion 1390 of the slot component 1386. Stated differently, the slot component 1386 can define two slots.

As shown in FIG. 13B, a filter 1394 can be inserted into the first portion 1388 of the slot component 1386. The filter 1394 can include materials known to those of skill in the art that filter out dust and/or debris from the gas entering the first sensor head housing inlet 610-1 and/or the second sensor head housing inlet 610-2. For instance, in some embodiments, the filter 1394 can be a wire mesh filter, woven filter, nonwoven filter, etc.

As shown in FIG. 13B, a head protector 1380 can be inserted into the second portion 1390 of the slot component 1386. The head protector 1380 can be inserted between the filter 1394 and the sensor head 1309. Accordingly, any dust or debris dislodged by the removal of the filter 1394 can be prevented from reaching the sensor head 1309 by the head protector 1380. After cleaning or replacement of the filter 1394 is completed, the head protector 1380 can be removed and the aspirating smoke detector device can resume functioning. Removal of the head protector 1380 can be performed by gripping a protrusion 1382 of the head protector 1380 and withdrawing the head protector 1380 from the second portion 1390 of the slot component 1386.

Figure 14:
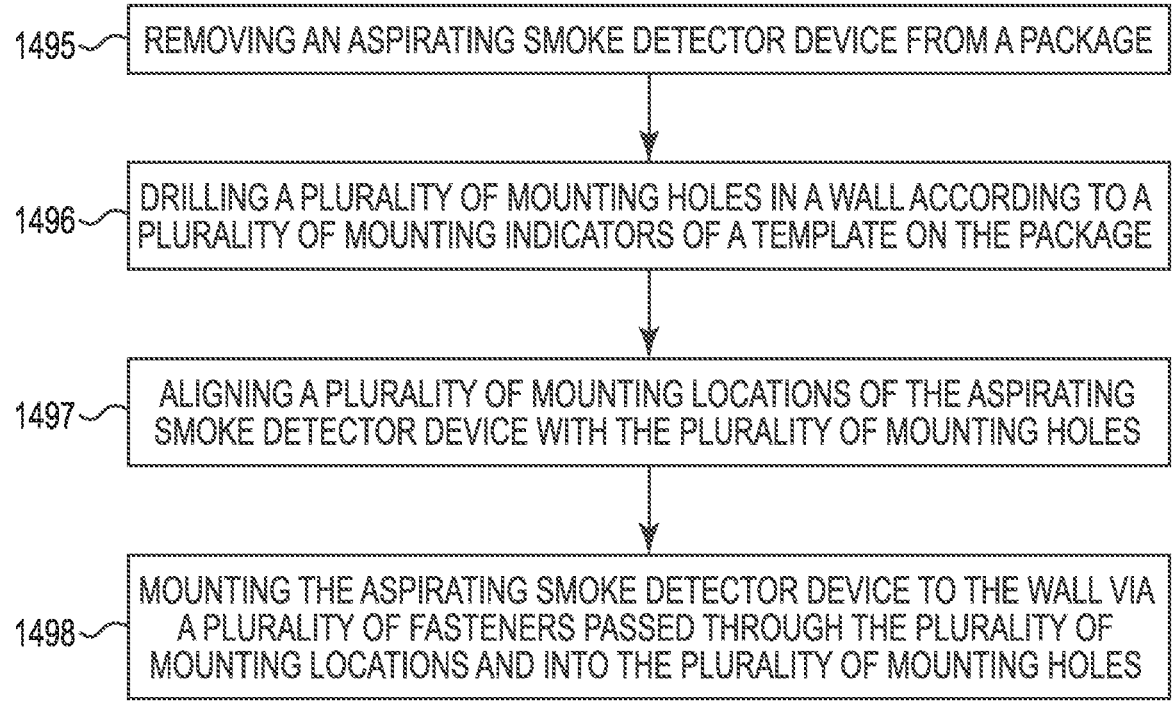
FIG. 14 illustrates a method of utilizing an aspirating smoke detector package in accordance with one or more embodiments of the present disclosure.

FIG. 14 illustrates a method of utilizing an aspirating smoke detector package in accordance with one or more embodiments of the present disclosure. At 1495, the method includes removing an aspirating smoke detector device from a package. At 1496, the method includes drilling a plurality of mounting holes in a wall according to a plurality of mounting indicators of a template on the package. In some embodiments, the template can be kept on the package or removed from the package. The template can be placed on the wall where the smoke detector is desired. Mounting holes can be drilled into the wall according to the location of the mounting indicators. In some embodiments, the mounting indicators are printed indicia (e.g., circles, crosshairs, etc.) such that a drill bit can drill through the printed indicia and into the wall behind. In some embodiments, the mounting indicators are apertures such that a drill bit can be extended through the aperture during drilling.

At 1497, the method includes aligning a plurality of mounting locations of the aspirating smoke detector device with the plurality of mounting holes, and at 1498, the method includes mounting the aspirating smoke detector device to the wall via a plurality of fasteners passed through the plurality of mounting locations and into the plurality of mounting holes. As previously discussed, once the holes are drilled, the mounting locations can be aligned with the drilled holes and the smoke detector can be mounted using suitable fasteners (e.g., screws, anchors, etc.).

In some embodiments, the method includes steps performed after the mounting of the smoke detector device. For instance, the method can include removing a head protector from the package, inserting the head protector into a second portion of a slot component, and removing a filter from a first portion of the slot component while the head protector is inserted into the second portion of the slot component. Some embodiments include cleaning the filter and re-inserting it before removing the head protector. Some embodiments include discarding the filter and inserting a new filter before removing the head protector.

Figure 15:
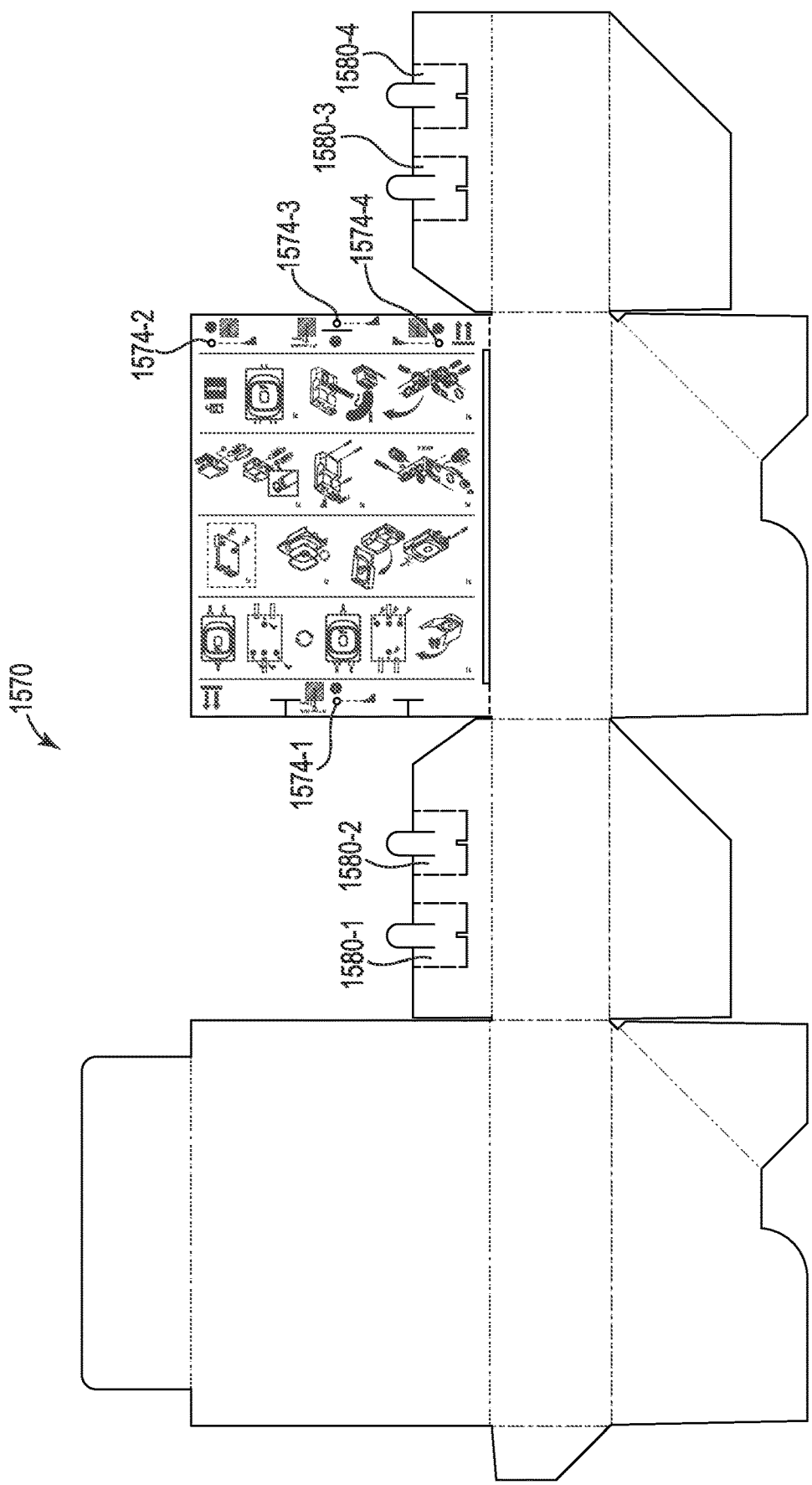
FIG. 15 is a top view of an example unassembled aspirating smoke detector device package in accordance with one or more embodiments of the present disclosure.

FIG. 15 is a top view of an example unassembled aspirating smoke detector device package 1570 in accordance with one or more embodiments of the present disclosure. In an "unassembled" state, the package 1570 is shown laid flat with a plurality of panels. As will be appreciated by those of skill in the art, the panels can be folded, joined, inserted, and/or fastened together to form a three-dimensional package configured to contain an aspirating smoke detector device.

As shown in FIG. 15, the package 1570 includes a plurality of head protectors: a first head protector 1580-1, a second head protector 1580-2, a third head protector 1580-3, and a fourth head protector 1580-4 (cumulatively referred to herein as "head protectors 1580"). Additionally, as shown in FIG. 15, the package 1570 includes a mounting template. The mounting template can include a number of mounting indicators. For instance, as shown in the example illustrated in FIG. 15, the mounting template includes a first mounting indicator 1574-1, a second mounting indicator 1574-2, a third mounting indicator 1574-3, and a fourth mounting indicator 1574-4 (referred to cumulatively as "mounting indicators 1574"). As shown in the example illustrated in FIG. 15, embodiments herein include mounting indicators located on more than one panel of the package 1570. Additionally, in some embodiments, such as that shown in the example illustrated in FIG. 15, the package (e.g., the panel comprising the mounting indicators 1574) can include instructions associated with utilizing the mounting indicators 1574, assembling the aspirating smoke detector device, mounting the aspirating smoke detector device, and/or utilizing the head protectors 1580 to protect sensor heads, as described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combinations of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A package for an aspirating smoke detector device, comprising:
a plurality of panels, wherein:
a first panel includes a mounting template having a plurality of mounting indicators, wherein each of the plurality of mounting indicators corresponds to a respective mounting location of the aspirating smoke detector device; and
a second panel includes a head protector configured to be removed from the package and inserted into a slot of the aspirating smoke detector device.

2. The package of claim 1, wherein the package is a cardboard package.

3. The package of claim 1, wherein the first panel and the second panel are a same panel.

4. The package of claim 1, wherein the first panel and the second panel are different panels.

5. The package of claim 1, wherein the plurality of mounting indicators are printed on the first panel.

6. The package of claim 1, wherein the plurality of mounting indicators are apertures defined by surfaces extending through the first panel.

7. The package of claim 1, wherein the plurality of mounting indicators include three mounting indicators.

8. The package of claim 7, wherein the three mounting indicators include:
a first mounting indicator located on a first half of the first panel;
a second mounting indicator located on a second half of the first panel; and
a third mounting indicator located on the second half of the first panel.

9. The package of claim 1, wherein the head protector includes a protrusion located along an edge of the head protector.

10. The package of claim 9, wherein the protrusion is configured to protrude from the aspirating smoke detector device when the head protector is inserted into the slot of the aspirating smoke detector device.

11. The package of claim 1, wherein the head protector is defined by a plurality of perforations through the second panel.

12. A system, comprising:
an aspirating smoke detector device; and
a package configured to contain the aspirating smoke detector device;
wherein the aspirating smoke detector device includes:
a plurality of mounting locations;
a sensor head housing, wherein the sensor head housing includes a housing inlet, a housing outlet, and a slot component;
a sensor head within the sensor head housing;
a blower configured to draw gas into the sensor head housing through the housing inlet and out of the sensor head housing through the housing outlet; and
a filter retained in the sensor head housing by a first portion of the slot component; and
wherein the package includes:
a mounting template having a plurality of mounting indicators, wherein each of the plurality of mounting indicators corresponds to one of the plurality of mounting locations; and
a head protector configured to be removed from the package and inserted into a second portion of the slot component.

13. The system of claim 12, wherein the second portion of the slot component is between the first portion of the slot component and the sensor head.

14. The system of claim 12, wherein a plurality of mounting locations are located on a housing of the aspirating smoke detector device.

15. The system of claim 12, wherein the head protector includes a protrusion configured to extend above the second portion of the slot component when the head protector is inserted into the second portion of the slot component.

16. A method, comprising:
removing an aspirating smoke detector device from a package;
drilling a plurality of mounting holes in a wall according to a plurality of mounting indicators of a template on the package;
aligning a plurality of mounting locations of the aspirating smoke detector device with the plurality of mounting holes; and
mounting the aspirating smoke detector device to the wall via a plurality of fasteners passed through the plurality of mounting locations and into the plurality of mounting holes.

17. The method of claim 16, wherein the method includes placing the template against the wall and drilling through each of the plurality of mounting indicators into the wall.

18. The method of claim 16, wherein:
the aspirating smoke detector device includes:
a sensor head housing, including a housing inlet, a housing outlet, and a slot component;
a sensor head within the sensor head housing;
a blower configured to draw gas into the sensor head housing through the housing inlet and out of the sensor head housing through the housing outlet; and
a filter retained in the sensor head housing by a first portion of the slot component; and
wherein the package includes:
a removable head protector; and
wherein the method includes:
removing the head protector from the package;
inserting the head protector into a second portion of the slot component; and
removing the filter from the first portion of the slot component while the head protector is inserted into the second portion of the slot component.

19. The method of claim 18, wherein the method includes:
cleaning the filter while the head protector is inserted into the second portion of the slot component;
inserting the cleaned filter into the first portion of the slot component; and
removing the head protector from the second portion of the slot component.

20. The method of claim 18, wherein the method includes:
discarding the removed filter while the head protector is inserted into the second portion of the slot component;
inserting a new filter into the first portion of the slot component; and removing the head protector from the second portion of the slot component.

\* \* \* \* \*